(12) United States Patent
Goto et al.

(10) Patent No.: US 8,996,140 B2
(45) Date of Patent: Mar. 31, 2015

(54) MULTICHANNEL POWER CONTROLLER

(75) Inventors: Shigefumi Goto, Tokyo (JP); Mitsugu Honda, Tokyo (JP)

(73) Assignee: RKC Instrument Inc., Tokyo (JP)

( * ) Notice: Subject to any disclaimer, the term of this patent is extended or adjusted under 35 U.S.C. 154(b) by 282 days.

(21) Appl. No.: 13/520,298

(22) PCT Filed: Dec. 20, 2010

(86) PCT No.: PCT/JP2010/072870
§ 371 (c)(1),
(2), (4) Date: Jul. 2, 2012

(87) PCT Pub. No.: WO2011/118103
PCT Pub. Date: Sep. 29, 2011

(65) Prior Publication Data
US 2013/0116848 A1    May 9, 2013

(30) Foreign Application Priority Data

Mar. 24, 2010   (JP) .................................. 2010-067966

(51) Int. Cl.
*H02J 3/14* (2006.01)
(52) U.S. Cl.
CPC ............... *H02J 3/14* (2013.01); *Y02B 70/3225* (2013.01); *Y04S 20/222* (2013.01); *Y04S 20/224* (2013.01)
USPC .......................................... 700/22; 713/320
(58) Field of Classification Search
None
See application file for complete search history.

(56) References Cited

U.S. PATENT DOCUMENTS

| 4,064,485 A * | 12/1977 | Leyde ............................. 307/39 |
| 4,920,252 A * | 4/1990 | Yoshino ......................... 219/497 |
| 5,615,105 A * | 3/1997 | Tofigh et al. ...................... 700/9 |
| 2011/0218688 A1* | 9/2011 | Lentner ......................... 700/293 |

FOREIGN PATENT DOCUMENTS

| JP | 64-9510 A | 1/1989 |
| JP | 64-50633 | 2/1989 |
| JP | 11-262174 A | 9/1999 |
| JP | 2007-116816 A | 5/2007 |

OTHER PUBLICATIONS

International Search Report dated March 10, 2011, mailed March 22, 2011.

* cited by examiner

*Primary Examiner* — Ryan Jarrett
*Assistant Examiner* — Md N Mia
(74) *Attorney, Agent, or Firm* — Norris McLaughlin & Marcus P.A.

(57) ABSTRACT

An object of the present invention is to provide a multichannel power controller for limiting the number of channels with outputs therefrom simultaneously turned on and enabling power conditioning that makes the ratio of the "ON time" to the "ON+OFF time" for the output proportional to the input value, thus allowing the power capacity of the power plant to be set to the minimum required value, when a plurality of channels are subjected to time-sharing output control.

5 Claims, 15 Drawing Sheets

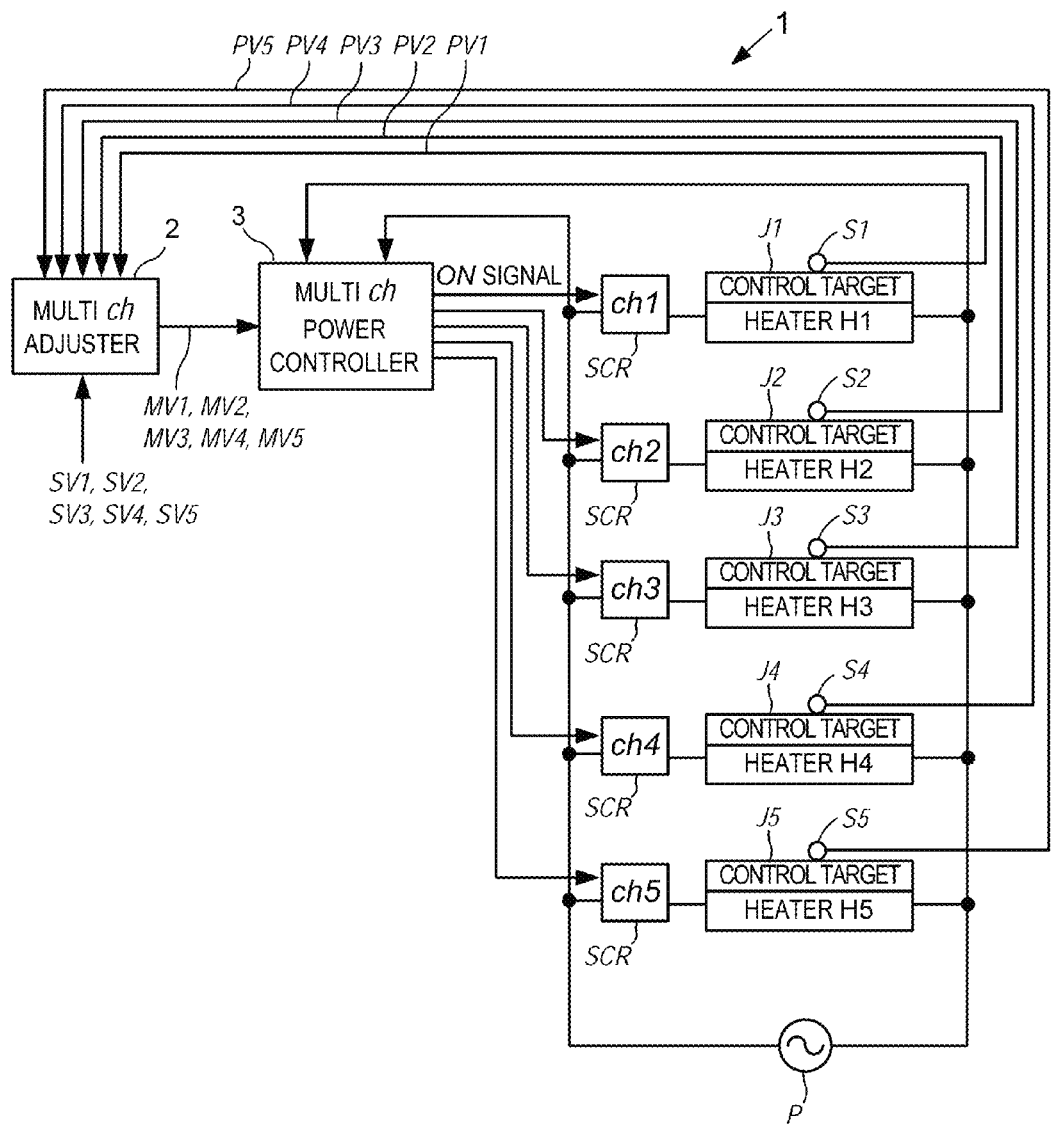
F I G. 1

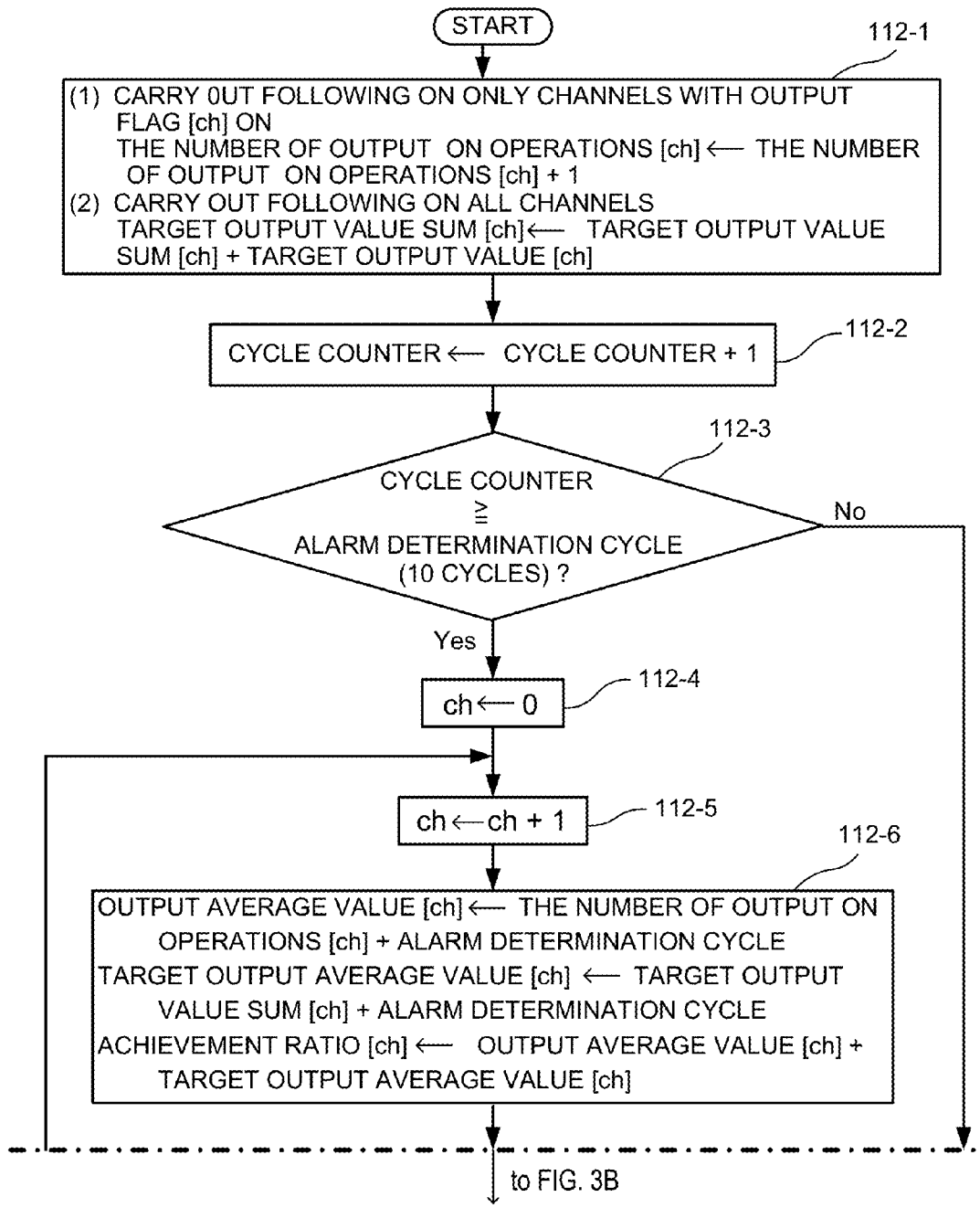
F I G. 3A

EXAMPLE WITH APPROPRIATE TOTAL POWER UPPER-LIMIT VALUE

| | TOTAL VALUE UPPER-LIMIT VALUE | 1800W | | | | |

| OUTPUT CYCLE | | ITEM | ch1 | ch2 | ch3 | ch4 | ch5 | TOTAL |
|---|---|---|---|---|---|---|---|---|
| | | RATED POWER | 200W | 400W | 600W | 800W | 1000W | 3000W |
| | | TARGET OUTPUT VALUE | 30% | 40% | 50% | 60% | 70% | |
| | | OUTPUT RESULT | 30% | 40% | 50% | 60% | 70% | AVERAGE POWER |
| | | THE NUMBER OF OUTPUT ON OPERATIONS | 3 | 4 | 5 | 6 | 7 | 1700W |
| | | RESULT DETERMINATION | OK | OK | OK | OK | OK | OK |
| 1 | | INTEGRATED VALUE | 30% | 40% | 50% | 60% | 70% | |
| | | RANK | 5 | 4 | 3 | 2 | 1 | |
| | | SUPPLIED POWER | 0W | 0W | 0W | 800W | 1000W | 1800W |
| 2 | | INTEGRATED VALUE | 60& | 80% | 100% | 20% | 40% | |
| | | RANK | 3 | 2 | 1 | 5 | 4 | |
| | | SUPPLIED POWER | 200W | 400W | 600W | 0W | 0W | 1200W |
| 3 | | INTEGRATED VALUE | -10% | 20% | 50% | 80% | 110% | |
| | | RANK | 5 | 4 | 3 | 2 | 1 | |
| | | SUPPLIED POWER | 0W | 0W | 0W | 800W | 1000W | 1800W |
| 4 | | INTEGRATED VALUE | 20% | 60% | 100% | 40% | 80% | |
| | | RANK | 5 | 3 | 1 | 4 | 2 | |
| | | SUPPLIED POWER | 200W | 0W | 600W | 0W | 1000W | 1800W |
| 5 | | INTEGRATED VALUE | -50% | 100% | 50% | 100% | 50% | |
| | | RANK | 5 | 2 | 4 | 1 | 3 | |
| | | SUPPLIED POWER | 0W | 400W | 600W | 800W | 0W | 1800W |
| 6 | | INTEGRATED VALUE | -20% | 40% | 0% | 60% | 120% | |
| | | RANK | 5 | 3 | 4 | 2 | 1 | |
| | | SUPPLIED POWER | 0W | 0W | 0W | 800W | 1000W | 1800W |
| 7 | | INTEGRATED VALUE | 10% | 80% | 50% | 20% | 90% | |
| | | RANK | 5 | 2 | 3 | 4 | 1 | |
| | | SUPPLIED POWER | 200W | 400W | 0W | 0W | 1000W | 1600W |
| 8 | | INTEGRATED VALUE | -60% | 20% | 100% | 80% | 60% | |
| | | RANK | 5 | 4 | 1 | 2 | 3 | |
| | | SUPPLIED POWER | 0W | 400W | 600W | 800W | 0W | 1800W |
| 9 | | INTEGRATED VALUE | -30% | -40% | 50% | 40% | 130% | |
| | | RANK | 4 | 5 | 2 | 3 | 1 | |
| | | SUPPLIED POWER | 0W | 0W | 600W | 0W | 1000W | 1600W |
| 10 | | INTEGRATED VALUE | 0% | 0% | 0% | 100% | 100% | |
| | | RANK | 5 | 4 | 3 | 2 | 1 | |
| | | SUPPLIED POWER | 0W | 0W | 0W | 800W | 1000W | 1800W |

* RESERVED DISPLAY INDICATES ON CHANNEL AND SUPPLIED POWER

F I G. 5

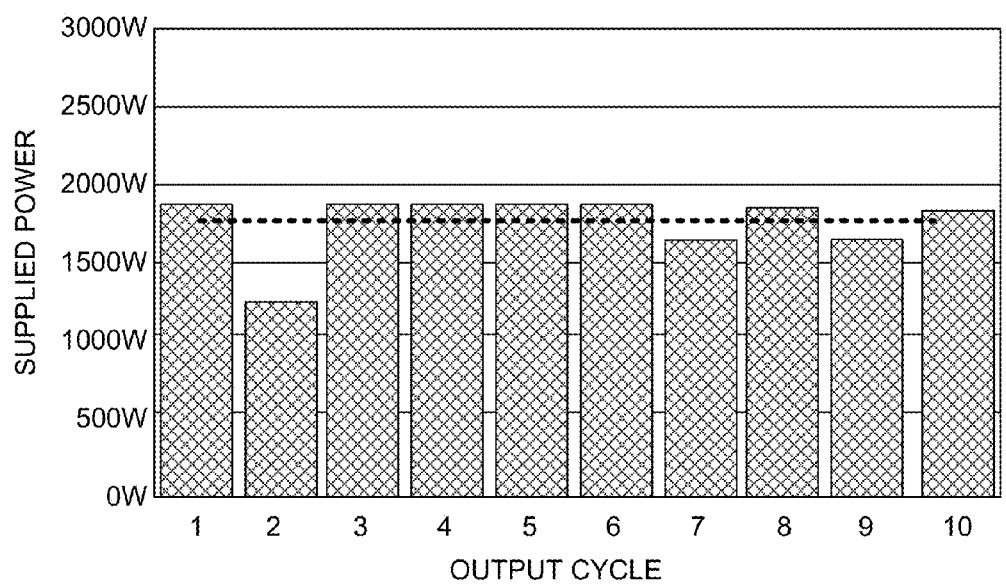
F I G. 6

EXAMPLE WITH EXCESSIVELY SMALL TOTAL POWER UPPER-LIMIT VALUE

| | | | | | TOTAL VALUE UPPER-LIMIT VALUE | 1500W |
|---|---|---|---|---|---|---|---|
| OUTPUT CYCLE | ITEM | ch1 | ch2 | ch3 | ch4 | ch5 | TOTAL |
| | RATED POWER | 200W | 400W | 600W | 800W | 1000W | 3000W |
| | TARGET OUTPUT VALUE | 30% | 40% | 50% | 60% | 70% | |
| | OUTPUT RESULT | 30% | 40% | 30% | 40% | 60% | AVERAGE POWER |
| | THE NUMBER OF OUTPUT ON OPERATIONS | 3 | 4 | 3 | 4 | 6 | 1700W |
| | RESULT DETERMINATION | OK | OK | NG | NG | NG | NG |
| 1 | INTEGRATED VALUE | 30% | 40% | 50% | 60% | 70% | |
| | RANK | 5 | 4 | 3 | 2 | 1 | |
| | SUPPLIED POWER | 0W | 400W | 0W | 0W | 1000W | 1400W |
| 2 | INTEGRATED VALUE | 60% | -20% | 100% | 120% | 40% | |
| | RANK | 3 | 5 | 2 | 1 | 4 | |
| | SUPPLIED POWER | 0W | 0W | 600W | 800W | 0W | 1400W |
| 3 | INTEGRATED VALUE | 90% | 20% | 50% | 80% | 110% | |
| | RANK | 2 | 5 | 4 | 3 | 1 | |
| | SUPPLIED POWER | 200W | 0W | 0W | 0W | 1000W | 1200W |
| 4 | INTEGRATED VALUE | 20% | 60% | 100% | 140% | 80% | |
| | RANK | 5 | 4 | 2 | 1 | 3 | |
| | SUPPLIED POWER | 0W | 0W | 600W | 800W | 0W | 1400W |
| 5 | INTEGRATED VALUE | 50% | 100% | 50% | 100% | 150% | |
| | RANK | 5 | 3 | 4 | 2 | 1 | |
| | SUPPLIED POWER | 0W | 400W | 0W | 0W | 1000W | 1400W |
| 6 | INTEGRATED VALUE | 80% | 40% | 100% | 160% | 120% | |
| | RANK | 4 | 5 | 3 | 1 | 2 | |
| | SUPPLIED POWER | 0W | 0W | 600W | 800W | 0W | 1400W |
| 7 | INTEGRATED VALUE | 110% | 80% | 50% | 120% | 190% | |
| | RANK | 3 | 4 | 5 | 2 | 1 | |
| | SUPPLIED POWER | 200W | 0W | 0W | 0W | 1000W | 1200W |
| 8 | INTEGRATED VALUE | 40% | 120% | 100% | 180% | 160% | |
| | RANK | 5 | 3 | 4 | 1 | 2 | |
| | SUPPLIED POWER | 200W | 400W | 0W | 800W | 0W | 1400W |
| 9 | INTEGRATED VALUE | -30% | 60% | 150% | 140% | 230% | |
| | RANK | 5 | 4 | 2 | 3 | 1 | |
| | SUPPLIED POWER | 0W | 400W | 0W | 0W | 1000W | 1400W |
| 10 | INTEGRATED VALUE | 0% | 0% | 200% | 200% | 200% | |
| | RANK | 5 | 4 | 3 | 2 | 1 | |
| | SUPPLIED POWER | 0W | 0W | 0W | 0W | 1000W | 1000W |

* RESERVED DISPLAY INDICATES ON CHANNEL AND SUPPLIED POWER

F I G. 7

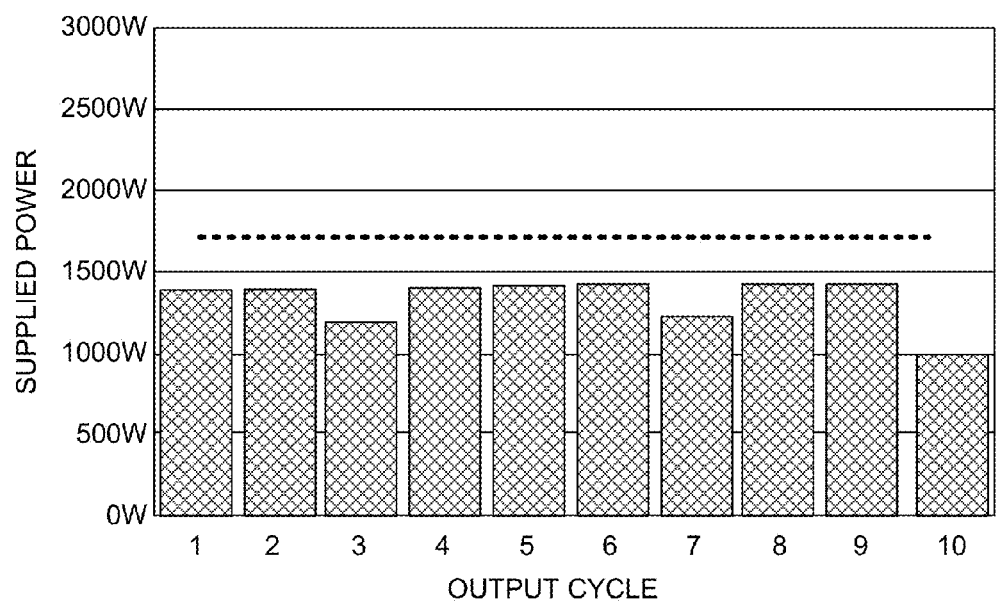
F I G. 8

EXAMPLE WITH POWER CONSUMPTION PEAK SUPPRESSION FUNCTION TURNED OFF

| TOTAL VALUE UPPER-LIMIT VALUE | 3000W |

| OUTPUT CYCLE | ITEM | ch1 | ch2 | ch3 | ch4 | ch5 | TOTAL |
|---|---|---|---|---|---|---|---|
| | RATED POWER | 200W | 400W | 600W | 800W | 1000W | 3000W |
| | TARGET OUTPUT VALUE | 30% | 40% | 50% | 60% | 70% | |
| | OUTPUT RESULT | 30% | 40% | 50% | 60% | 70% | AVERAGE POWER |
| | THE NUMBER OF OUTPUT ON OPERATIONS | 3 | 4 | 5 | 6 | 7 | 1700W |
| | RESULT DETERMINATION | OK | OK | OK | OK | OK | OK |
| 1 | INTEGRATED VALUE | 30% | 40% | 50% | 60% | 70% | |
| 1 | RANK | 5 | 4 | 3 | 2 | 1 | |
| 1 | SUPPLIED POWER | 200W | 400W | 600W | 800W | 1000W | 3000W |
| 2 | INTEGRATED VALUE | -40% | -20% | 0% | 20% | 40% | |
| 2 | RANK | 5 | 4 | 3 | 2 | 1 | |
| 2 | SUPPLIED POWER | 0W | 0W | 0W | 800W | 1000W | 1800W |
| 3 | INTEGRATED VALUE | -10% | 20% | 50% | -20% | 10% | |
| 3 | RANK | 4 | 2 | 1 | 5 | 3 | |
| 3 | SUPPLIED POWER | 0W | 400W | 600W | 0W | 1000W | 2000W |
| 4 | INTEGRATED VALUE | 20% | -40% | 0% | 40% | -20% | |
| 4 | RANK | 2 | 5 | 3 | 1 | 4 | |
| 4 | SUPPLIED POWER | 200W | 0W | 0W | 800W | 0W | 1000W |
| 5 | INTEGRATED VALUE | -50% | 0% | 50% | 0% | 50% | |
| 5 | RANK | 5 | 4 | 2 | 3 | 1 | |
| 5 | SUPPLIED POWER | 0W | 0W | 600W | 0W | 1000W | 1600W |
| 6 | INTEGRATED VALUE | -20% | 40% | 0% | 60% | 20% | |
| 6 | RANK | 5 | 2 | 4 | 1 | 3 | |
| 6 | SUPPLIED POWER | 0W | 400W | 0W | 800W | 1000W | 2200W |
| 7 | INTEGRATED VALUE | 10% | -20% | 50% | 20% | -10% | |
| 7 | RANK | 3 | 5 | 1 | 2 | 4 | |
| 7 | SUPPLIED POWER | 200W | 0W | 600W | 800W | 0W | 1600W |
| 8 | INTEGRATED VALUE | -60% | 20% | 0% | -20% | 60% | |
| 8 | RANK | 5 | 2 | 3 | 4 | 1 | |
| 8 | SUPPLIED POWER | 0W | 400W | 0W | 0W | 1000W | 1400W |
| 9 | INTEGRATED VALUE | -30% | -40% | 50% | 40% | 30% | |
| 9 | RANK | 4 | 5 | 1 | 2 | 3 | |
| 9 | SUPPLIED POWER | 0W | 0W | 600W | 800W | 1000W | 2400W |
| 10 | INTEGRATED VALUE | 0% | 0% | 0% | 0% | 0% | |
| 10 | RANK | 5 | 4 | 3 | 2 | 1 | |
| 10 | SUPPLIED POWER | 0W | 0W | 0W | 0W | 0W | 0W |

* RESERVED DISPLAY INDICATES ON CHANNEL AND SUPPLIED POWER

F I G. 9

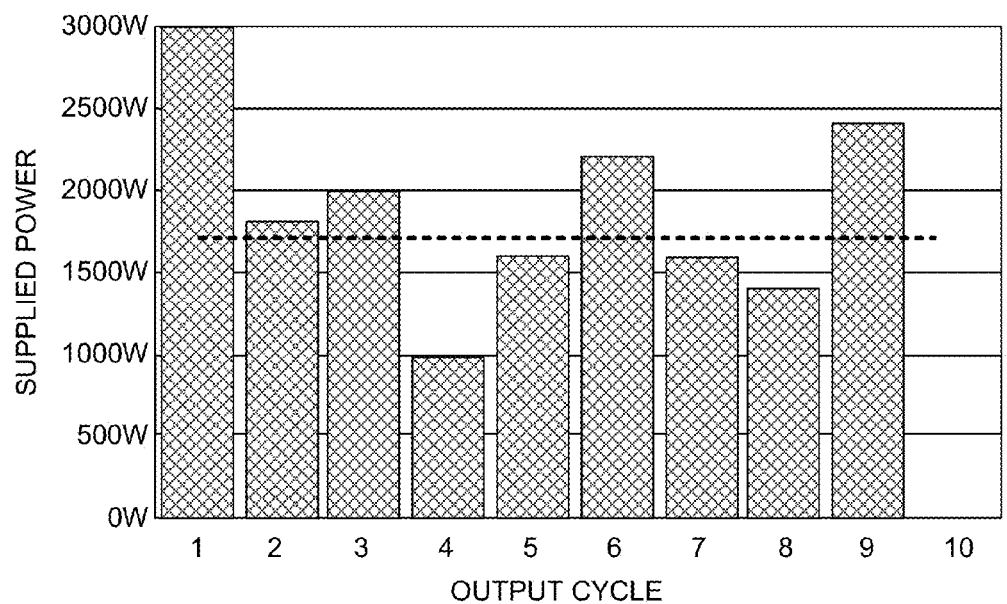
F I G. 10

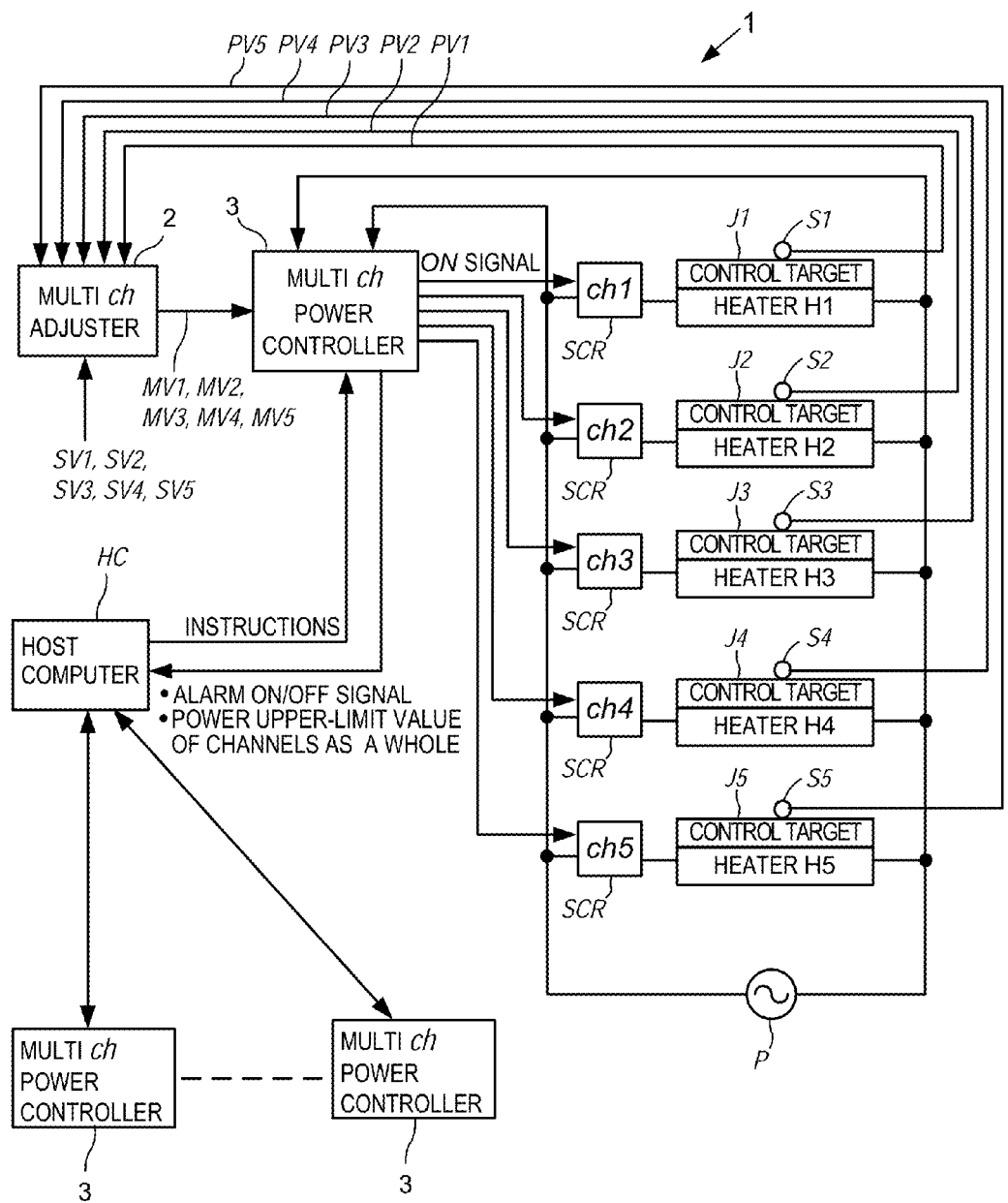
F I G. 11

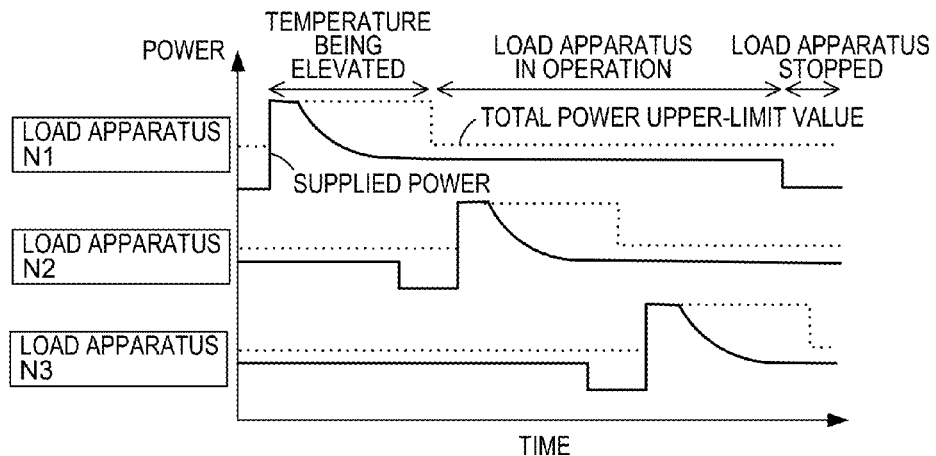

F I G. 12

| APPARATUS NAME | LOAD APPARATUS N1 | LOAD APPARATUS N2 | LOAD APPARATUS N3 | TOTAL POWER CONSUMPTION | POWER UPPER-LIMIT VALUE OF LOAD APPARATUS GROUP |
|---|---|---|---|---|---|
| OPERATING STATUS | TEMPERATURE BEING ELEVATED | TEMPERATURE BEING ELEVATED | IN OPERATION | | |
| INSTRUCTION UPPER-LIMIT POWER | 3000W | 3000W | 1000W | 7000W | 6000W |

NOTE) "INSTRUCTION UPPER-LIMIT POWER" IS POWER UPPER-LIMIT VALUE OF CHANNELS AS A WHOLE SET IN MULTICHANNEL POWER CONTROLLER IN ACCORDANCE WITH INSTRUCTION FROM HOST COMPUTER

F I G. 13

| APPARATUS NAME | LOAD APPARATUS N1 | LOAD APPARATUS N2 | LOAD APPARATUS N3 | TOTAL POWER CONSUMPTION | POWER UPPER-LIMIT VALUE OF LOAD APPARATUS GROUP |
|---|---|---|---|---|---|
| OPERATING STATUS | TEMPERATURE BEING ELEVATED | TEMPERATURE BEING ELEVATED | IN OPERATION | | |
| INSTRUCTION UPPER-LIMIT POWER | 3000W | 2000W | 1000W | 6000W | 6000W |

NOTE) "INSTRUCTION UPPER-LIMIT POWER" IS POWER UPPER-LIMIT VALUE OF CHANNELS AS A WHOLE SET IN MULTICHANNEL POWER CONTROLLER IN ACCORDANCE WITH INSTRUCTION FROM HOST COMPUTER

F I G. 14

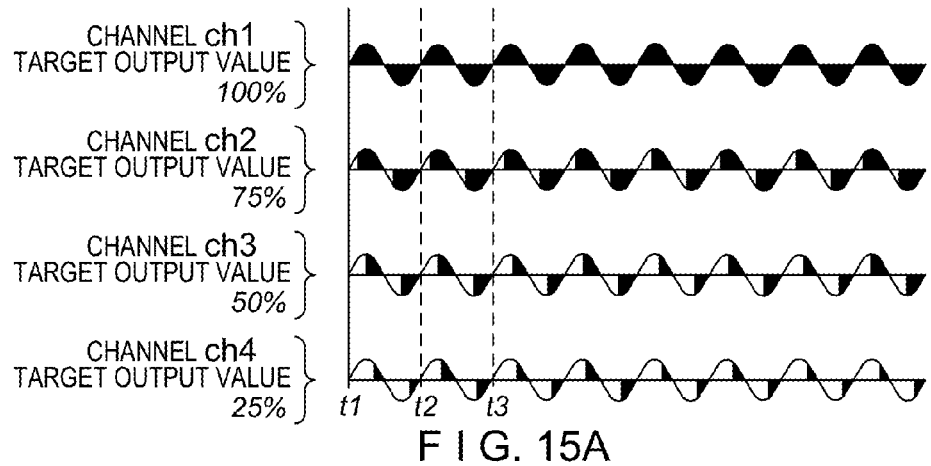
F I G. 15A
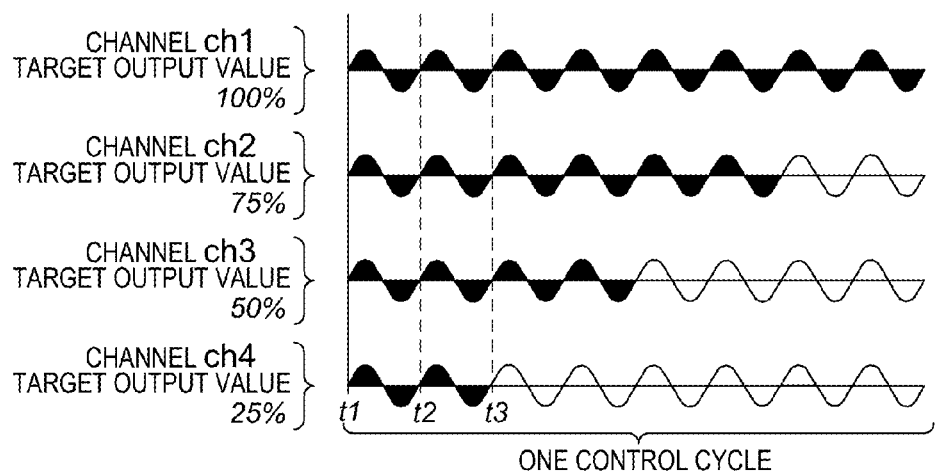
F I G. 15B
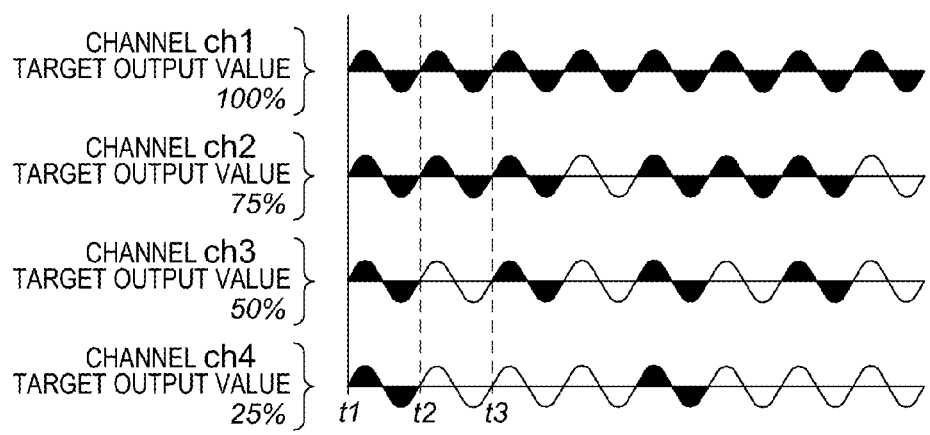
F I G. 15C

MULTICHANNEL POWER CONTROLLER

This application is a 371 application of PCT/JP2010/072870 filed Dec. 10, 2010, which claims priority to the Japanese application 2010-067966 Mar. 24, 2010.

TECHNICAL FIELD

The present invention relates to a multichannel power controller for controlling an AC power supply to a heater or any other load, for example, for controlling an AC power supply to a heater for temperature control of a semiconductor manufacturing apparatus or an injection molding machine.

BACKGROUND ART

Power conditioners use an output from an adjuster as an input and an input value as a target output value to provide an AC power supply (hereinafter referred to as an "output") to a load with a voltage value, a current value, or a power value that is proportional to the target output value. Some power conditioners are based on a phase control scheme (see FIG. 15(a)), and others are based on a scheme for controllably turning on or off the output to control the ratio of an "ON time" to an "ON time+OFF time" (the ratio is hereinafter referred to as a "load factor") so that the ratio is proportional to the target output value (see FIGS. 15(a) and 15(b)) (for these control schemes, see, for example, Patent Literature 1 or 2).

Furthermore, two schemes are available for making the load factor proportional to the target output value. One of the schemes sets the "ON time+OFF time" for the output to a constant time and makes the corresponding ratio of the "ON time" to the "ON time+OFF time" proportional to the target output value (see FIG. 15(b); this scheme is hereinafter referred to as a "time proportioning scheme"). The other controllably turns on or off the output every minimum time for which the output to the load (AC power supply) is on or off (the minimum time is hereinafter referred to as a "unit time"), and makes a load factor for a sufficiently long time proportional to the target output value (see FIG. 15(c); this scheme is hereinafter referred to as a "time-sharing output control scheme"). The unit time according to the time-sharing output control scheme is an integral multiple of a half cycle, and is normally a half cycle or one cycle.

The time-sharing output control scheme includes an integrator that integrates the target output value (0 to 1 or 0 to 100%) every unit time cycle. The time-sharing control scheme makes the load factor proportional to the target output value by repeating the following processing every unit time. When the value of the integrator is greater than any threshold value (fixed value), the output is kept on during the unit time. At the same time, 1 (100%) is subtracted from the integrator that integrates the target output value.

CITATION LIST

Patent Literature

Patent Literature 1: Japanese Patent Laid-Open No. 6-309043 (FIG. 6 to FIG. 8 and the description thereof)
Patent Literature 2: Japanese Patent Laid-Open No. 2004-164431 (FIG. 8 to FIG. 10 and the description thereof)

SUMMARY OF INVENTION

Technical Problem

If a plurality of channels are simultaneously controlled, when the individual channels are independently controlled by the time-sharing output control scheme, all the channels are simultaneously turned on at a certain moment. Thus, a power plant is required which can provide a power capacity equal to or greater than the total rated power of the loads on all the channels. However, the power required during control stabilization is often less than 50%, and as a result, such a power plant as described above is a surplus facility.

An object of the present invention is to provide a multichannel power controller for limiting the number of channels with outputs therefrom simultaneously turned on and enabling power conditioning that makes the ratio of the "ON time" to the "ON+OFF time" for the output proportional to the input value, thus allowing the power capacity of the power plant to be set to the minimum required value, when a plurality of channels are subjected to time-sharing output control.

Solution to Problem

To accomplish this object, a multichannel power controller according to the present invention outputs an ON signal or avoids outputting the ON signal, at a point near a zero potential of an AC power voltage, to each of a plurality of channels that provides an AC power supply as an output to a load, during a unit time that is a minimum time for which the output is on or off, thus distributing the output among the unit times, characterized by presetting a rated power value of the load on each of the channels and a power upper-limit value that is an upper limit value of a total output power from all the channels during each of the unit times (the power upper-limit value is hereinafter referred to as the "total power upper-limit value"), sequentially integrating a target output value of each channel, at each of the unit times, in a target output value integrator for the channel which integrates the target output value of the each channel, and after the integration process is finished for all the channels, carrying out the following processing on a channel by channel basis in order of decreasing integrated value of the target output value integrator for the channel.

<Processing>

When the integrated value of the target output value integrator is not greater than a threshold value, the multichannel power controller keeps the output from the channel off during the unit time. When the integrated value of the target output value integrator is greater than the threshold value and a value obtained by adding the rated power value of the load on the channel to a rated power total value of a rated power totalizer totaling the rated power values of the loads on the channels with outputs therefrom turned on by the On signal is equal to or smaller than the total power upper-limit value, the multichannel power controller carries out a process of adding the rated power value of the channel to the rated power totalizer, a process of keeping the output from the channel on during the unit time, and a process of subtracting 1 or 100% from the target output value integrator for the channel. When the integrated value of the target output value integrator is greater than the threshold value and the value obtained by adding the rated power total value of the rated power totalizer to the rated power value of the channel is equal to or greater than the total power upper-limit value, the multichannel power controller keeps the output from the channel off during the unit time.

The above-described "target output value of the channel" is a manipulated variable required to reduce the difference between a set value for a control target to be controlled by power applied to a load and a corresponding measured value. If AC power obtained when a switch (SCR or the like) for turning on and off an AC power voltage to be applied to the load is kept on is defined to be 1 (100%), the target output value is expressed by the ratio of an output ON time to the sum of the output ON time and an output OFF time, that is, 0 to 1 (0 to 100%).

The above-described "unit time that is the minimum time for which the output is on or off" is often a half or one cycle of an AC power voltage frequency, but may be an integral multiple of the half cycle. In an embodiment described below, one cycle of the AC power voltage frequency is the "unit time".

According to the present invention, when the channels are processed in order of decreasing integrated value of the target output value integrator for the channel, if the integrated value is identical for at least two channels, the channel with higher rated power is preferentially processed. If the rated power is also identical for the channels, any of the channels with the identical integrated value and the identical rated power may be preferentially selected.

The multichannel power controller according to the present invention may further have a function to calculate a target output average value for each channel over a predetermined period and an average value of an actual output value of the channel over the predetermined period and to output an alarm ON signal if a ratio of the calculated average value of the actual output value to the calculated target output average value is lower than a predetermined threshold value or a value obtained by subtracting the average value of the actual output value from the target output average value is equal to or greater than the predetermined threshold value.

The multichannel power controller according to the present invention may have a function to disable a power consumption peak suppression function by, for example, setting the total power upper-limit value equal to or greater than a total value of the rated power values of the loads on the respective channels.

The multichannel power controller according to the present invention may have a function to communicate with an external host computer, and when the external host computer outputs an instruction including the total power upper-limit value to the multichannel power controller, manage enabling/disabling of a function to set the total power upper-limit value equal to or smaller than the upper limit value of the total output power from all the channels during each of the unit times.

Advantageous Effects of Invention

By adopting the above-described configuration to set the "total power upper-limit value that is the upper limit value of the total output power from all the channels during each of the unit times" smaller than the "total value of the rated power of the loads on the respective channels", the present invention can provide a multichannel power controller that limits the number of channels with outputs therefrom simultaneously turned on, thus preventing all the channels from being simultaneously turned on so that it is sufficient for a power plant to secure power equal to the total power upper-limit value smaller than the total value of the rated power of the loads on the respective channels, allowing the power capacity of the power plant to be reduced to the minimum required value.

In particular, the configuration for "outputting the alarm ON signal" as described above is a function to notify an apparatus user, the host computer, or the like that the current total power upper-limit value fails to allow power required for the load to be properly supplied, that is, the corresponding channel fails to output AC power to the load as specified by the target output value, leading to insufficient power supply to the load.

For example, if loads as a whole such as a plurality of heaters for which power supply is controlled by a single multichannel power controller are collectively considered to be a single load apparatus, then in a factory with plural pairs each of such a load apparatus and a multichannel power controller, when power supply to any of the load apparatuses becomes insufficient, the multichannel power controller for the load apparatus outputs the alarm ON signal. Thus, the apparatus user or an operator of the host computer can quickly take a proper measure, for example, enable the power supply required for the load apparatus, by changing the "total power upper-limit value" for the multichannel power controller.

Furthermore, the present invention provides the configuration for "outputting the alarm ON signal" or the configuration with the additional function to switch between enabling and disabling of the power consumption peak suppression function of the multichannel power controller in accordance with an instruction from the external host computer. Hence, for example, in a factory with plural pairs each of a load apparatus and a multichannel power controller as described above, the host computer in the factory manages the power consumption peak suppression function of each multichannel power controller to enable the power consumption peak of each load apparatus group to be suppressed. This allows the power consumption peak of the factory as a whole to be suppressed, contributing to reducing the power capacity of the power plant in the factory and thus facility costs.

Load apparatuses in injection molding machines and extruders which constitute a factor consuming high power are roughly classified into heater-like load apparatuses for heating barrels, nozzles, or the like and power-based load apparatuses such as screws and winders. Among these load apparatuses, the heater-like load apparatus consumes high power during temperature elevation, but after the temperature elevation is completed, consumes power substantially lower than that during the temperature elevation. On the other hand, the power-based load apparatus starts to operate to consume power after the temperature elevation for the barrels, nozzles, or the like is completed.

Thus, the host computer in the factory gives an instruction to the present multichannel power controller for controlling such heater-like load apparatuses as described above to disable the power consumption peak suppression function during the temperature elevation, allowing the temperature to be elevated faster. After the temperature elevation is completed, the host computer gives an instruction to the multichannel power controller to enable the power consumption peak suppression function, thus suppressing the power consumption peak. Consequently, the load apparatuses have a high operation rate, and the power consumption can be averaged.

Furthermore, in a factory such as a semiconductor factory where a large number of heater-like and power-based load apparatuses operate simultaneously and for 24 hours, the power consumption increases while the temperature of the heater-like load apparatuses is being elevated. Thus, avoiding the simultaneous elevation of temperature of the heater-like load apparatuses enables the power consumption peak of the factory as a whole to be suppressed. To achieve this, the present multichannel power controller is adopted as a power control device for the load apparatuses and the host computer in the factory manages the present multichannel power controller for the load apparatuses. Thus, the host computer monitors the total power consumption of the factory as a whole, and to elevate the temperature of the inactive heater-like load apparatuses when the factory cannot provide sufficient power, activates the heater-like load apparatuses with the power consumption peak suppression function of the present multichannel power controller for the heater-like load apparatuses enabled. Then, once the factory has recovered sufficient power, the host computer may automatically disable the function. Moreover, while monitoring the total power consumption of the factory as a whole, the host computer changes the setting of "total power upper-limit value" in the present multichannel power controller to an appropriate power value. This increases operation efficiency and enables the power consumption peak to be carefully controlled.

BRIEF DESCRIPTION OF DRAWINGS

FIG. 1 is a schematic diagram of a multiple-channel temperature control device to which a multichannel power controller according to an embodiment of the present invention is applied.

FIG. 2, comprising FIG. 2B is a continuation of FIG. 2A.

FIG. 3, comprising FIGS. 3A and 3B, is a flowchart showing an example of an alarm determination process in the flowchart in FIG. 2, whereby FIG. 3B is a continuation of FIG. 3A.

FIG. 5 is a diagram showing the results of output control of each channel obtained when the multichannel power controller with five channels shown in FIG. 1 performs the processing operation shown in the flowchart in FIG. 2 under the conditions that an alarm determination cycle corresponds to 10 cycles of an AC power voltage frequency, that a threshold value (predetermined rate) for an achievement ratio is 1 (100%), and that a total power upper-limit value is 1,800 W.

FIG. 6 is a graph showing the total value of power supplied by the channels as a whole during each output cycle, as a summary of the results of the output control in FIG. 5.

FIG. 7 is a diagram showing the results of output control obtained when the processing operation shown in the flowchart in FIG. 2 is performed with the total power upper-limit value in FIG. 5 changed to 1,500 W.

FIG. 8 is a graph showing the total value of power supplied by the channels as a whole during each output cycle, as a summary of the results of the output control in FIG. 7.

FIG. 9 is a diagram showing the results of output control obtained when the processing operation shown in the flowchart in FIG. 2 is performed with the total power upper-limit value in FIG. 5 changed to 3,000 W.

FIG. 10 is a graph showing the total value of power supplied by the channels as a whole during each output cycle, as a summary of the results of the output control in FIG. 9.

FIG. 11 is a diagram showing a configuration of a power control system in a factory with a plurality of multichannel power controllers shown in FIG. 1.

FIG. 12 is a diagram showing the concept of elapsed time and power consumption observed when (three) multichannel power controllers shown in FIG. 11 control power to the respective load apparatuses.

FIG. 13 is a diagram showing an example of the relationship between the "total power upper-limit value" and the "power upper-limit value of the load apparatus group" which are set in the multichannel power controller for each load apparatus when the (three) multichannel power controllers shown in FIG. 11 control power to the respective load apparatuses.

FIG. 14 is a diagram showing an example of the relationship between the "total power upper-limit value" and the "power upper-limit value for the load apparatus group" which are set in the multichannel power controller for each load apparatus when the (three) multichannel power controllers shown in FIG. 11 control power to the respective load apparatuses.

FIG. 15($a$) is a diagram illustrating a phase control scheme, FIG. 15($b$) is a diagram illustrating a time proportioning output control scheme based on zero cross point switching, and FIG. 15($c$) is a diagram illustrating a conventional time-sharing output control scheme based on zero cross point switching.

DESCRIPTION OF EMBODIMENT

Figure 2A:
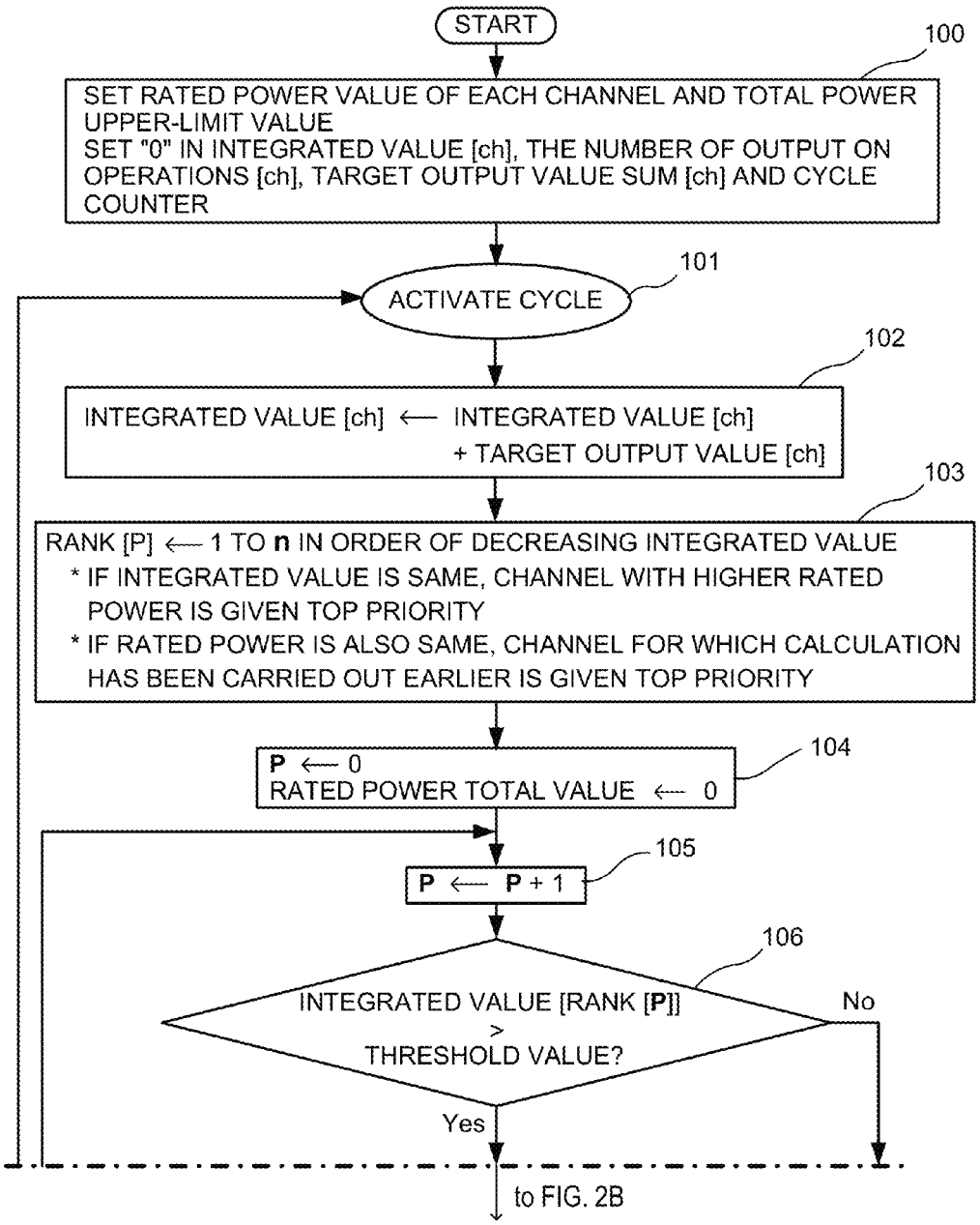
FIGS. 2A and 2B, is a flowchart showing an example of a processing operation of the multichannel power controller in FIG. 1, whereby

An embodiment for carrying out the present invention will be described below in detail with reference to the attached drawings.

FIG. 1 is a schematic diagram of a multiple-channel temperature control device to which a multichannel power controller according to an embodiment of the present invention is applied.

A multiple-channel temperature control device 1 in FIG. 1 includes a plurality of (in the example shown in FIG. 1, five) channels ch1 to ch5 that provide AC power supplies (outputs) as outputs to the respective heaters H1 to H5 (loads), a multichannel adjuster 2 that calculates a target output value for each of the channels ch1 to ch5, and a multichannel power controller 3 that controls the AC power supplies (outputs) provided to the heaters H1 to H5 by the channels ch1 to ch5 based on the target output values. The heaters H1 to H5 adjust the temperatures of control targets J1 to J5.

<Detailed Configuration of the Channels>

Each of the channels ch1 to ch5 includes a power switching element SCR (hereinafter referred to as an "SCR"). The SCR is turned on to provide an AC power supply (output) to the corresponding one of the heaters H1 to H5.

In the example shown in FIG. 1, the control device is configured as follows. Each of the heaters H1 to H5 and an AC power source P are connected in series to a terminal for switching power from the SCR. An ON signal from the multichannel power controller 3 is input to a terminal for controllably turning on and off the SCR. Then, the SCR is turned on to provide an AC power supply (output). The section that switches power may be an SSR (Solid State Relay).

The channels ch1 to ch5 are denoted by the channel numbers ch1 to ch5 for convenience of description. In the example shown in FIG. 1, the channels are sequentially provided with the channel numbers from the top to the bottom.

<Detailed Configuration of the Multichannel Adjuster>

The multichannel adjuster 2 has a function to individually calculate target output values MV1 to MV5 (manipulated variables) for the channels ch1 to ch5 by, for example, determining differences between set temperatures SV1 to SV5 (set values) of corresponding control targets J1 to J5 with the temperatures thereof controlled by the corresponding heaters H1 to H5 and measured temperatures PV1 to PV5 (measured values) of the corresponding control targets J1 to J5, and performing a PID calculation to determine the corresponding target output values MV1 to MV5 for reducing the differences. Such an adjuster may be replaced with five single loop adjusters.

The measured temperatures PV1 to PV5 of the respective control targets J1 to J5 are measured by measurement means S1 to S5 such as temperature sensors installed in the individual control targets J1 to J5. The measured values (measured temperatures PV1 to PV5) are input to the multichannel adjuster 2.

A scheme may be adopted which allows the target output values MV1 to MV5 of outputs (AC power supplies) to the respective heaters H1 to H5 to be manually input, for example, via a touch panel (not shown in the drawings) regardless of the temperatures of the control targets J1 to J5. In this case, the measurement means S1 to S5 such as temperature sensors are not essential.

For convenience of description, the above-described target output values MV1 to MV5 and the integrated values thereof (described below) are expressed in percentages (%) such that the AC power obtained when the SCR is kept on is defined to be 100%. For example, a target output value with an output ON time ratio of ¼ or ½ is expressed as 25% or 50%, respectively.

<Detailed Configuration of the Multichannel Power Controller>

Figure 2B:
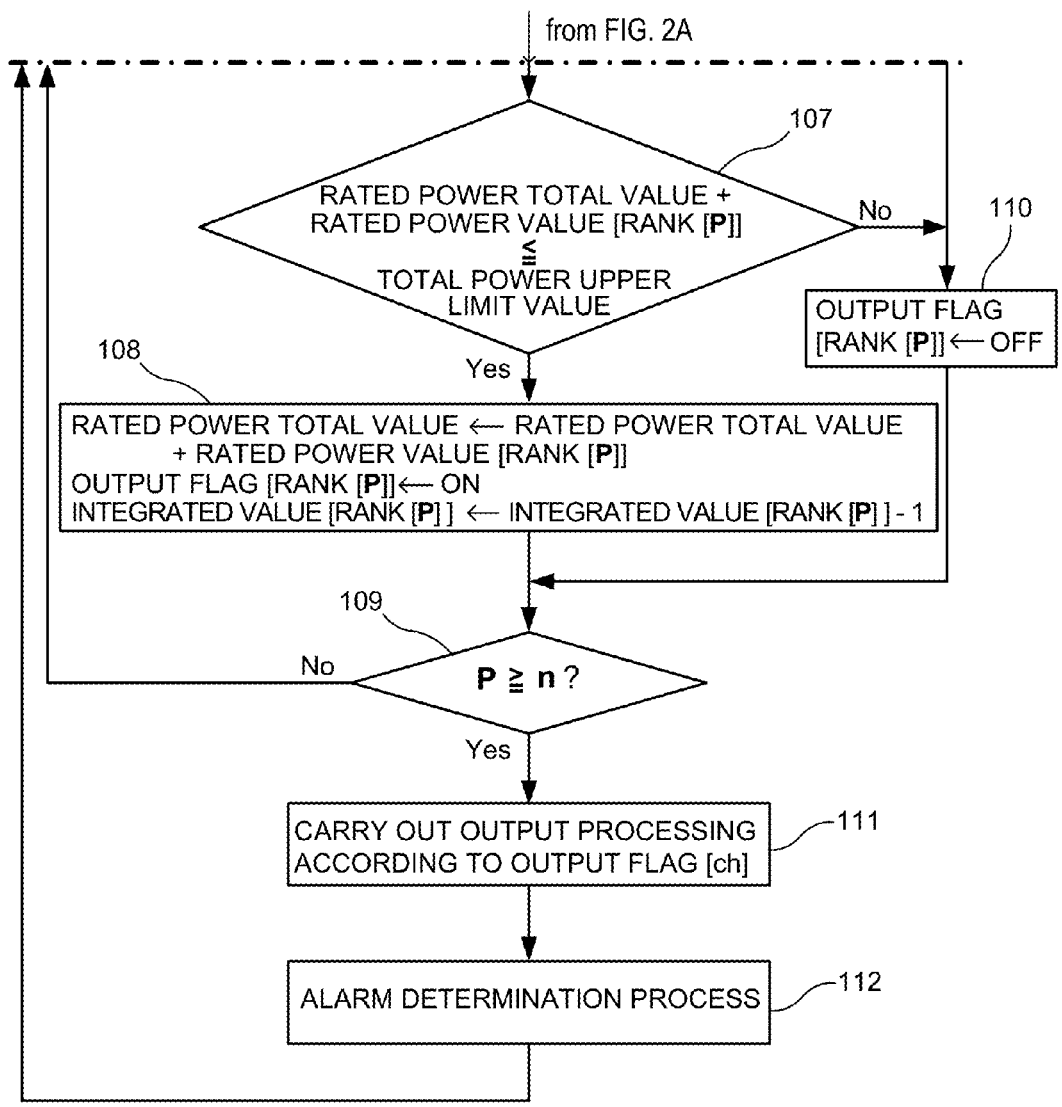
Figure 3B:
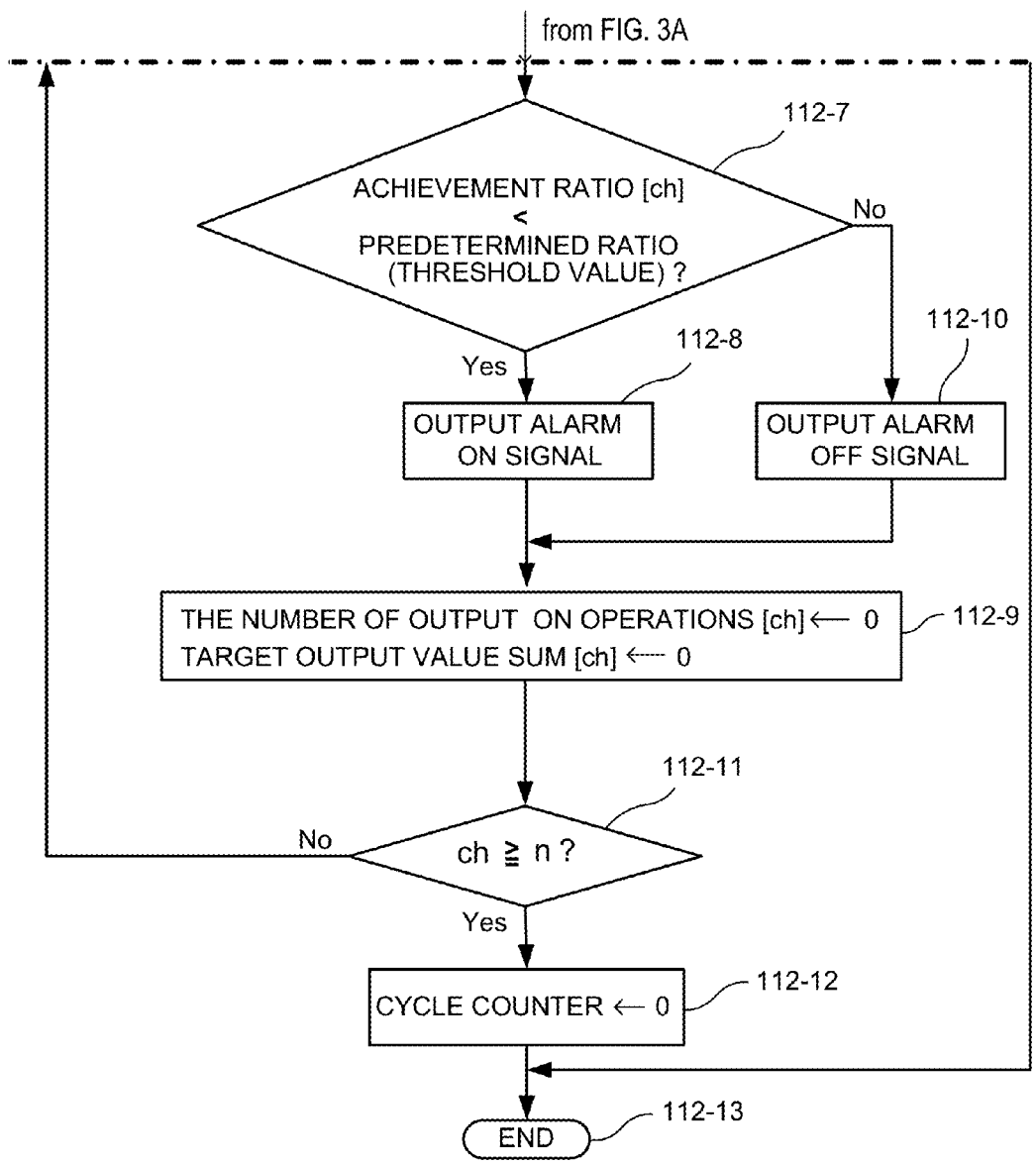
Figure 4:
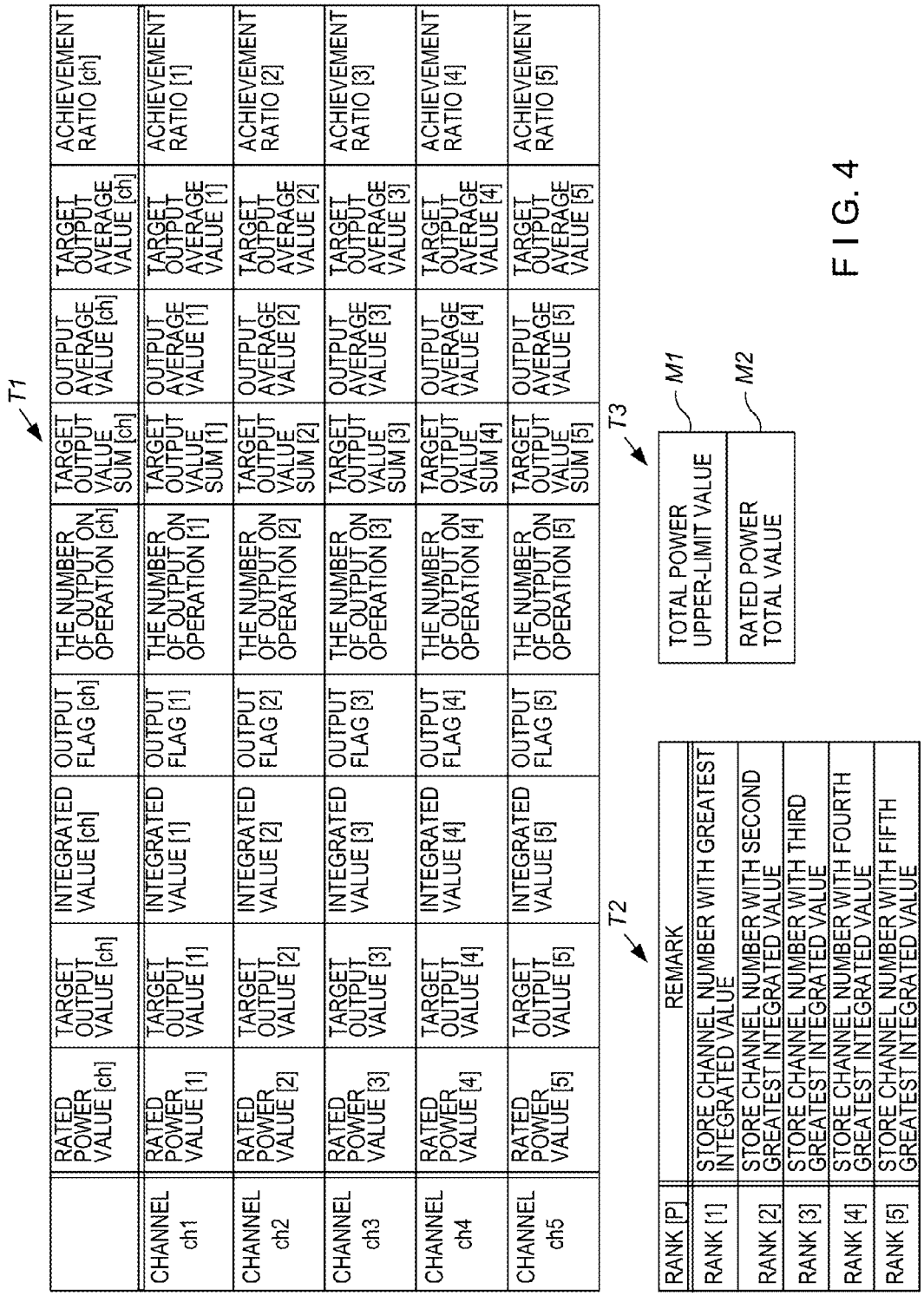
FIG. 4 is a diagram illustrating a variable table for use in the multichannel power controller during execution of the processing operation shown in the flowchart in FIG. 2.

The multichannel power controller 3 is formed of a microcomputer including various hardware resources such as a ROM in which a system program and the like required to perform processing operations shown in flowcharts in FIG. 2 and FIG. 3 are stored, a CPU that executes the system program, a RAM in which variable tables T1 to T3 in FIG. 4 which are used in executing the system program are stored, an output section that outputs or avoids outputting an ON signal as a result of the execution of the system program. The multichannel power controller 3 executes the processing operations shown in the flowcharts in FIG. 2 and FIG. 3 to fulfill at least a first function to a seventh function described below.

(1) First Function

The first function outputs an ON signal that turns on the SCR or avoids outputting the ON signal, at a point near a zero potential of an AC power voltage, to each of the above-described plurality of channels ch1 to ch5, during a unit time (one cycle of an AC power voltage frequency in this embodiment; this also applies to the description below) that is the minimum time for which an output (AC power supply) from the channel is on or off, thus distributing the output (AC power supply) among the unit times (zero cross time-sharing output control function). The multichannel power controller 3 in FIG. 1 adopts SCRs as elements for performing power control on the individual channels ch1 to ch5 and is configured to output the ON signal to each of the SCRs as described above.

(2) Second Function

The second function allows an operator to set the rated power value of the load on each of the channels ch1 to ch5 (specifically, rated power values [1] to [5] in a first variable table T1 shown in FIG. 4) and a total power upper-limit value that is the upper limit value of the total output power from all the channels ch1 to ch5 (specifically, a first storage area M1 in a third variable table T3 shown in FIG. 4) during each unit time (one cycle of the AC power voltage frequency). As the rated power value set herein, for example, a value indicated on the load or the specification thereof as a rated power value or a value obtained by measuring power actually consumed by the load (the measured value of power consumption of the load) may be adopted. If the measured value is adopted, the control device may include means for measuring current and voltage of the load on each of the channels ch1 to ch5 (not shown in the drawings) and means for calculating the measured value of power consumption of the load based on the measured values of the current and voltage and storing the calculated measured value at the rated power value (rated power value [ch]) of the load on each of the channels ch1 to ch5.

(3) Third function

The third function repeats processing carried out by the fourth to seventh functions described below, at every unit time described above.

(4) Fourth function

The fourth function integrates the target output values of the respective channels ch1 to ch5 (inputs to the multichannel power controller 3) in target output value integrators for the respective channels ch1 to ch5 (specifically, integrated values [1] to [5] in the first variable table shown in FIG. 4. This also applies to the description below).

(5) Fifth Function

The fifth function carries out a process of arranging the channels in order of decreasing integrated value of the target output value integrator for each of the channels ch1 to ch5 (specifically, the integrated values [1] to [5] in the first variable table T1 shown in FIG. 4) to determine the order in which the channels are processed by the sixth and seventh functions described below (ranking of the channels), after the integration process has been finished by the above-described fourth function for all the channels ch1 to ch5, and a process of clearing a rated power total value in a rated power totalizer (specifically, a second storage area M2 in the third variable table T3 shown in FIG. 4. This also applies to the description below). The ranking of the channels corresponds to the order of decreasing value (integrated value) of the target output value integrator (the integrated values [1] to [5] in the first variable table T1) as described below.

(6) Sixth Function

The sixth function compares the integrated value of the target output value integrator (the integrated values [1] to [5] in the first variable table T1) with a threshold value allowing determination of whether to turn on or off the output to determine whether or not the integrated value is greater or smaller than the threshold value, in the order of the channels determined by the fifth function. The sixth function then feeds channels each with an integrated value greater than the threshold to the subsequent seventh function as output ON candidates, while keeping outputs from channels off each of which has an integrated value not greater than the threshold value, during the unit time.

(7) Seventh Function

The seventh function carries out the following processing on the output ON candidate channels fed by the sixth function, that is, the channels for which the integrated value of the corresponding target output value integrator (the integrated values [1] to [5] in the first variable table T1) is greater than the threshold value.

<Processing>

When a value obtained by adding the rated power value of the load on the channel preset by the second function (the rated power values [1] to [5] in the first variable table T1) to the rated power total value of the rated power totalizer (the second storage area M2 in the third variable table T3) is equal to or smaller than the total power upper-limit value preset by the second function, the device carries out a process of adding the rated power value of the channel to the rated power totalizer, a process of keeping the channel on during the unit time, and a process of subtracting 1 (100%) from the target output value integrator for the channel. On the other hand, when the value obtained by the addition is equal to or greater than the total power upper-limit value, the channel is kept off during the unit time.

The processing based on the sixth and seventh functions is repeated for each channel in the order of the channels determined by the fifth function. After the processing is finished for all the channels, the device waits until the next unit time and repeats the processing based on the fourth to seventh functions when the subsequent unit time starts.

FIG. 4 is a diagram illustrating a variable table for use by the multichannel power controller in performing the processing operation shown in the flowchart in FIG. 2.

As shown in FIG. 4, the first variable table T1 includes areas that store the rated power value [ch], the target output value [ch], the integrated value [ch], an output flag [ch], the number of output ON operations [ch], a target output value sum [ch], an output average value [ch], a target output average value [ch], and an achievement ratio [ch], respectively.

The rated power value [ch] is composed of array variables including the rated power value [1] to the target output value [5]. For example, the rated power value of the load on the channel ch1 is stored in the rated power value [1], and the rated power value of the load on the channel ch2 is stored in the rated power value [2]. This also applies to the other rated power values [3] to [5].

The target output value [ch] is composed of array variables including the target output value [1] to the target output value [5]. For example, the target output value of the channel ch1 is stored in the target output value [1], and the target output value of the channel ch2 is stored in the target output value [2]. This also applies to the other target output values [3] to [5].

The integrated value [ch] is composed of array variables including the integrated value [1] to the integrated value [5], and functions as a target output integrator for integrating the respective target output values MV1 to MV5 for the channels ch1 to ch5. For example, the integrated value for the channel ch1 is stored in the integrated value [1], and the integrated value for the channel ch2 is stored in the integrated value [2]. This also applies to the other integrated values [3] to [5].

The output flag [ch] is composed of array variables including the output flag [1] to the output flag [5]. For example, a flag indicating whether or not to enable the output (AC power supply) from the channel ch1 (whether or not to turn on the output) is stored in the output flag [1]. Specifically, "ON" is stored in the output flag [1] to enable the output (turn on the output), and "OFF" is stored in the output flag [1] to disable the output (turn off the output). This also applies to the other output flags [2] to [5].

The number of output ON operations [ch] is composed of array variables including the number of output ON operations [1] to the number of output ON operations [5]. For example, the number of output ON operations of the channel ch1 is stored in the number of output ON operations [1], and the number of output ON operations of the channel ch2 is stored in the number of output ON operations [2]. This also applies to the other number of output ON operations [3] to [5].

Here, the "number of output ON operations" refers to the number of times that one of the channels is selected as an output ON channel and outputs power (AC power supply) during an alarm determination cycle. Specifically, if the unit time for the control of the output (AC power supply) is defined to be one cycle of the AC power voltage frequency and 10 such cycles are defined to be the alarm determination cycle, when for example, the channel ch1 outputs power during any three cycles during the alarm determination cycle, the number of output ON operations [1] of the channel ch1 is "3". This also applies to the numbers of output ON operations [2] to [5] of the other channels ch2 to ch5.

The "alarm determination cycle" is a cycle during which whether the output (AC power supply) from the channel is equal or close to the target output value is determined based on the achievement ratio described below.

The target output value sum [ch] is composed of array variables including the target output value sum [1] to the target output value sum [5]. For example, the target output value sum of the channel ch1 is stored in the target output value sum [1], and the target output value sum of the channel ch2 is stored in the target output value sum [2]. This also applies to the other target output value sums [3] to [5].

Here, the "target output value sum" refers to a total sum of the target output values of the repeated addition of the target output value of the processing target channel at the beginning of a new cycle during the alarm determination cycle. For example, when the alarm determination cycle corresponds to 10 cycles of the AC power voltage frequency, since the target output value of the channel ch1 is "30%", the target output value sum [1] of the channel ch1 is 30%×10. This also applies to the target output value sums [2] to [5] of the other channels ch2 to ch5.

The output average value [ch] is composed of array variables including the output average value [1] to the output average value [5]. For example, the output average value of the channel ch1 described below is stored in the output average value [1], and the output average value of the channel ch2 also described below is stored in the output average value [2]. This also applies to the other output average values [3] to [5].

The target output average value [ch] is composed of array variables including the target output average value [1] to the target output average value [5]. For example, the target output average value of the channel ch1 described below is stored in the target output average value [1], and the target output average value of the channel ch2 also described below is stored in the target output average value [2]. This also applies to the other target output average values [3] to [5].

The achievement ratio [ch] is composed of array variables including the achievement ratio [1] to the achievement ratio [5]. For example, the achievement ratio of the channel ch1 described below is stored in the achievement ratio [1], and the achievement ratio of the channel ch2 also described below is stored in the achievement ratio [2]. This also applies to the other achievement ratios [3] to [5].

A rank [P] in the second variable table T2 is composed of array variables including a rank [1] to a rank [5]. For example, the channel number of the channel with the greatest integrated value [ch] is stored in the rank [1]. The channel number of the channel with the second greatest integrated value [ch] is stored in the rank [2]. In accordance with this rule, relevant channel numbers are stored in a rank [3], a rank [4], and a rank [5]. Thus, the channel number of the channel with the smallest integrated value [ch] is stored in the final rank [5]. Specifically, if the integrated value [2] for the channel ch2 is the greatest, the channel number "2" is stored in the rank [1]. If the integrated value [4] for the channel ch4 is the second greatest, the channel number "4" is stored in the rank [2].

The third variable table T3 includes the two storage areas M1 and M2. The first storage area M1 stores the total power upper-limit value (the upper limit value of the total output power from all the channels ch1 to ch5 during each unit time), among the values set by the above-described second function.

In the third variable table T3, the second storage area M2 functions as a rated power totalizer that totals the rated power values of the loads on the channels with outputs therefrom turned on by the ON signal (any of the rated power values [1] to [5]), to store the rated power total value obtained. The rated power total value varies during execution of the processing operation shown in the flowchart in FIG. 2 described below. For example, in initial processing in the flowchart in FIG. 2 (see step 104), the rated power total value takes an initial value "0". Thereafter, the rated power total value becomes a value obtained by adding the rated power value of an output ON channel (any of the rated power values [1] to [5]) to the initial value "0" (see step 108 in the flowchart in FIG. 2) or further a value obtained by adding, to the value obtained by the addition, the rated power value of another output ON channel (any of the rated power values [1] to [5]) through the repetition of the processing operation of step 108. Since the example shown in FIG. 1 involves the five channels ch1 to ch5, the rated power total value may take a value equal to the sum of the rated power values of up to five channels (all the rated power values [1] to [5]) during the execution of the processing operation shown in the flowchart in FIG. 2.

<Description of Operation of the Multiple-Channel Temperature Control Device>

Now, the general operation of the multiple-channel temperature control device 1 in FIG. 1 configured as described above will be described.

In the present multiple-channel temperature control device 1, when an operation switch (not shown in the drawings) is depressed, the multichannel adjuster 2 and the multichannel power controller 3 are actuated, and the measured temperatures PV1 to PV5 of the control targets J1 to J5 output by the measurement means S1 to S5 for the heaters H1 to H5 are input to the multichannel adjuster 2.

The multichannel adjuster 2 calculates the target output values MV1 to MV5 based on the measured temperatures PV1 to PV5 and set temperatures SV1 to SV5 of the control targets J1 to J5, and outputs the resultant target output values MV1 to MV5 to the multichannel power controller 3. On the other hand, the multichannel power controller 3 starts a series of processing operations shown in the flowcharts in FIG. 2 and FIG. 3. The detailed operation of the multichannel power controller 3 will be described based on the flowcharts in FIG. 2 and FIG. 3.

<Detailed Operation of the Multichannel Power Controller>

As shown in FIG. 2, the multichannel power controller 3 first carries out initial processing (step 100). In the initial processing, the multichannel power controller 3 sets the rated power values [ch] of the channels ch1 to ch5 in the variable table T1 shown in FIG. 4, and sets the total power upper-limit value in the storage area M1 of the variable table T3. Moreover, in the initial processing, the multichannel power controller 3 sets "0" in each of the integrated value [ch], the number of output ON operations [ch], and target output value sum [ch] in the variable table T1 shown in FIG. 4 and in a cycle counter to initialize the integrated values [1] to [5], the numbers of output [ON] operations [1] to [5], target output value sums [1] to [5], and cycle counters of all the channels ch1 to ch5 (step 100).

Then, to perform a series of processing operations from steps 103 to 112 described below, during each unit time (in the present example, one cycle of the AC power voltage frequency), the multichannel power controller 3 activates the operations synchronously with the frequency cycle of the AC power voltage. The synchronized processing cycle can be acquired from the AC power voltage input to the multichannel power controller 3 by the AC power source P (step 101).

Subsequently, the multichannel power controller 3 integrates the target output values MV1 to MV5 for the respective channels ch1 to ch5. This integration process is carried out as follows. For example, for the channel ch1 with the channel number "1", the multichannel power controller 3 adds the target output value [1] to the integrated value [1] on the variable table T1, and sets the resultant addition value in the integrated value [1]. This also applies to the other channels ch2 to ch5 (step 102).

Once the process of integrating the target output values MV1 to MV5 is completed for all the channels ch1 to ch5 as described above, the multichannel power controller 3 ranks the channels in order of decreasing integrated value, and stores the ranks in the rank [P] on the variable table T2. For example, if the integrated value [2] for the channel ch2 is the greatest, the channel number "2" is stored in the rank [1]. If the integrated value [4] for the channel ch4 is the second greatest, the channel number "4" is stored in the rank [2] (step 103).

Then, the multichannel power controller 3 resets both the value of the rank counter P and the rated power total value in the variable table T3 to "0" (step 104), and increments the value of the rank counter P by "1" (step 105). The multichannel power controller 3 thus carries out processing in steps 106 to 110 with the channels sequentially set to be a processing target, from the channel defined as the rank [1], that is, in order of decreasing integrated value.

In step 106, as a first condition, the multichannel power controller 3 determines whether or not the integrated value [rank [P]] for each of the processing target channels ch1 to ch5 is greater than a threshold value (0% in the present example). If the integrated value is greater than the threshold value (Yes in step 106), the multichannel power controller 3 proceeds to step 107.

In step 107, as a second condition, the multichannel power controller 3 determines whether or not a value obtained by adding the rated power total value in the variable table T3 to the rated power value [rank [P]] of the load on the processing target channel (the channel) is greater than the total power upper-limit value in the variable table T3. If the value obtained by the addition is not greater than the total power upper-limit value (Yes in step 107), the multichannel power controller 3 sets the output flag [rank [P]] for the processing target channel on (step 108). Thus, the processing target channel has been selected as an output ON channel.

Moreover, in the above-described step 108, the multichannel power controller 3 carries out a process of overwriting the rated power total value in the variable table T3 with the added value (the value obtained by adding the rated power total value in the variable table T3 to the rated power value [rank [P]] of the load on the processing target channel (the channel)) to update the rated power total value in the variable table T3, and a process of subtracting "1" from the integrated value [rank [P]] for the channel selected as described above and storing the result of the subtraction in the integrated value [rank [P]] for the processing target channel. The multichannel power controller 3 proceeds to the next step 109.

On the other hand, if the first condition is not met in the above-described step 106 (the integrated value of the target output value of the processing target channel is not greater than the threshold value) or the second condition is not met in the above-described step 107 (the rated power total value is greater than the total power upper-limit value), the multichannel power controller 3 sets the output flag [rank [P]] for the processing target channel off to record data indicating that the channel is not selected as an output ON channel (step 110). Then, the multichannel power controller 3 proceeds to step 109 (No in step 106 or No in step 107).

In step 109, the multichannel power controller 3 determines whether or not the value of the rank counter P is the final channel number n ("5" in the present example). If the value of the rank counter P is not the final channel number n (No in step 109), the multichannel power controller 3 returns to step 105 to increment the value of the rank counter P, and carries out the above-described processing in steps 106 to 109 on the channel with the next channel number. If the value of the rank counter P is the final channel number n (Yes in step 109), the multichannel power controller 3 proceeds to the next step 111 to carry out an output process based on the output flag [ch] on the variable table T1 (step 111).

In the output process carried out in step 111, for the channels with the output flag [ch] on the variable table T1 set "ON" (output ON channel), the multichannel power controller 3 outputs the ON signal to the SCR so that the SCR provides an AC power supply to the corresponding heater. On the other hand, for the channels with the output flag [ch] set "OFF", the multichannel power controller 3 avoids outputting the ON signal to the SCR so as to prevent an AC power supply from being provided to the corresponding heater (step 111).

When the above-described output process is completed, the multichannel power controller 3 carries out the alarm determination process in step 112. The alarm determination process is carried out in accordance with the flowchart shown in FIG. 3. The flowchart in FIG. 3 shows that in the alarm determination process, first, processes 1 and 2 described below are carried out (step 112-1).

[Process 1: Target for the Process 1→Only the Channels Having Output Power in Step 111]

If the processing target channel has output power in the above-described step 111, the multichannel power controller 3 increments and counts up the number of output ON operations [ch] of the channel. The multichannel power controller 3 avoids counting up the number of output ON operations [ch] of the channels not having output power (step 112-1).

[Process 2: Target for the Process 2→all the Channels]

Regardless of whether or not the processing target channel has output power in the above-described step 111, the multichannel power controller 3 adds the target output value of the channel to the target output value sum [ch] of the channel to update the target output value sum [ch] of the processing target channel (step 112-1).

When the process 1 and process 2 described above are completed, the multichannel power controller 3 increments and counts up the cycle counter (step 112-2), and determines whether or not the value of the cycle counter is equal to or greater than an alarm determination cycle (10 cycles of the AC voltage frequency in the present example) (step 112-3). Here, if the value of the cycle counter has not reached the alarm determination cycle (No in step 112-3), the multichannel power controller 3 skips steps 112-4 to 112-12 described below and returns to step 101 in FIG. 2 (step 112-13). Then, when the next cycle starts, the processing from the above-described step 102 to step 112 is repeated.

Then, the value of the cycle counter is incremented by one every time the processing from the above-described step 102 to step 112 (112-1 and 112-2) is repeated. When the value of the cycle counter finally reaches the alarm determination cycle (10 cycles of the AC power voltage frequency in the present example) (Yes in step 112-3), the multichannel power controller 3 proceeds to the next step 112-4.

In step 112-4, the multichannel power controller 3 resets the value of the channel counter ch to zero (step 112-4), and in the next step 112-5, increments the value of the channel counter ch by "1" (step 112-5). Thus, the multichannel power controller 3 carries out the processing from step 112-6 to step 112-10 on each channel sequentially set to be a processing target in order of increasing channel number.

In step 112-6, the multichannel power controller 3 determines the output average value of the processing target channel over the alarm determination cycle as the average value of the actual output value of the processing target channel over a predetermined period, and stores the output average value in the output average value [ch] of the channel. The output average value is calculated by "the number of output ON operations [ch] of the processing target channel÷the alarm determination cycle".

Then, in step 112-6, the multichannel power controller 3 determines the target output average value of the processing target channel over the alarm determination cycle as the target output average value of the processing target channel over a predetermined period, and stores the target output average value in the target output average value [ch] of the channel. The target output average value is calculated by "the target output value sum [ch]÷the alarm determination cycle".

Finally, in step 112-6, the multichannel power controller executes a calculation expressed by "the output average value (the average value of the actual output value)÷the target output average value)" to determine the achievement ratio of the processing target channel, and stores the determined achievement ratio in the achievement ratio [ch] of the channel. As described above, the achievement ratio is the ratio of the output average value (the average value of the actual output value) to the target output average value and is indicative of the ratio of that of the AC power corresponding to the target output value of the processing target channel which has been actually successfully supplied to the load throughout the alarm determination cycle (the ratio of the output).

The achievement ratio will be described in conjunction with the channel ch1 shown in FIG. 5. The target output value of the channel ch1 is 0.3 (30%), the target output value sum thereof is 0.3×10=3, and the number of output ON operations thereof during the alarm determination cycle (10 cycles) is 3. Furthermore, the output average value [1] of the channel ch1 is determined to be 0.3 by "the number of output ON operations [ch] of the processing target channel÷the alarm determination cycle", that is, 3÷10. The target output average value [1] of the channel ch1 is determined to be 0.3 by "the target output value sum [ch]÷the alarm determination cycle", that is, 3÷10. Thus, the achievement ratio [1] of the channel ch1 is determined to be 1 (100%) by "the output average value÷the target output average value", that is, 0.3÷0.3. This means that the channel ch1 provides an AC power supply (output) as specified by the target output value throughout the alarm determination cycle (10 cycles).

The achievement ratio will be described in conjunction with the channel ch5 shown in FIG. 7. The target output value of the channel ch5 is 0.7 (70%), the target output value sum thereof is 0.7×10=7, and the number of output ON operations thereof during the alarm determination cycle (10 cycles) is 6. Furthermore, the output average value [5] of the channel ch5 is determined to be 0.6 by "the number of output ON operations [ch] of the processing target channel÷the alarm determination cycle", that is, 6÷10. The target output average value [5] of the channel ch5 is determined to be 0.7 by "the target output value sum [ch]÷the alarm determination cycle", that is, 7÷10. Thus, the achievement ratio [5] of the channel ch5 is determined to be about 0.86 (about 86%) by "the output average value÷the target output average value", that is, 0.6/0.7. This means that the channel 5 does not provide an AC power supply (output) as specified by the target output value during the 10 cycles.

When the achievement ratio [ch] of the processing target channel is completed as described above, the multichannel power controller 3 determines whether or not the achievement ratio [ch] is lower than a predetermined ratio (1 (100%) in the present example) (step 112-7). Here, the "predetermined ratio" is a threshold value for the achievement ratio. If the achievement ratio [ch] is lower than the predetermined ratio (Yes in step 112-7), the multichannel power controller 3 outputs an alarm ON signal (step 112-8). However, if the achievement ratio [ch] is not lower than the predetermined ratio (No in step 112-7), the multichannel power controller 3 outputs an alarm OFF signal (step 112-10). In step 112-8, the multichannel power controller 3 may output the alarm ON signal in a case where a value obtained by subtracting the output average value (the average value of the actual output value) from the above-described target output average value is equal to or greater than a predetermined threshold.

Thereafter, the multichannel power controller 3 resets the number of output ON operations [ch] of the processing target channel and the target output value sum [ch] to zero (step 112-9), and determines whether or not the value of the channel counter ch is the final channel number n ("5" in the present example) (step 112-11). Here, if the value of the channel counter ch is not the final channel number n (No in step 112-11), the multichannel power controller 3 returns to step 112-5 to increment the channel counter ch value and carries out the processing from the above-described step 112-6 to step 112-10 on the channel with the next channel number. On the other hand, if the value of the channel counter ch is the final channel number n (Yes in step 112-11), the multichannel power controller 3 resets the cycle counter to zero (step 112-12) and returns to step 101 (step 112-13). Then, when the next cycle starts, the multichannel power controller 3 repeats the processing from steps 102 to 112.

FIG. 5 is a diagram showing the results of output control performed when the multichannel power controller 3 with five channels shown in FIG. 1 carries out the processing operations shown in the flowcharts in FIG. 2 and FIG. 3 under the conditions that the alarm determination cycle corresponds to 10 cycles of the AC power voltage frequency, that the threshold value (predetermined rate) for the achievement ratio is 1 (100%), and that the total power upper-limit value is 1,800 W.

In the example shown in FIG. 5, the total value of the rated power values of the loads on the channels ch1 to ch5 is 3,000 W, but since the total power upper-limit value is set to 1,800 W, the power consumption peak of the multiple-channel temperature control device 1 as a whole is limited to at most 1,800 W by the present multichannel power controller. That is, the example shown in FIG. 5 is an example in which the power consumption peak suppression function of the multichannel power controller is turned on by setting the "total power upper-limit value" to 1,800 W, which is lower than the "total value of rated power values of the channels".

In FIG. 5 and FIGS. 7 and 9 described below, "NG" means that the above-described "achievement ratio" is lower than the predetermined ratio. "OK" means that the "achievement ratio" is not lower than the predetermined ratio, that is, the AC power supply (output) can be distributed as specified by the target output value during 10 cycles of the AC power voltage frequency. Those of the cells in FIGS. 5, 7, and 9 which are other than the cells with "NG" or "OK" shown therein and which are reversed in black, indicate that the corresponding channel has been selected as an output ON channel and provided an AC power supply (output). Numerical values in the reversed cells are indicative of AC power supplied during the output.

The present multichannel power controller 3 carries out the initial processing in the above-described step 100 immediately after activation to initialize the integrated values [1] to [5] for all the channels ch1 to ch5 to be "0".

Thus, in FIG. 5, during the first output cycle 1, the target output values [1] to [5] of the channels ch1 to ch5 are each added to the initial value "0". Then, the integrated values [1] to [5] of the target output values of the channels ch1 to ch5 become 30%, 40%, 50%, 60%, and 70%, respectively. All of the integrated values [1] to [5] are greater than the threshold value (0%). Thus, all of the channels ch1 to ch5 are candidates to be selected as output ON channels.

However, the total value of the rated power values of the loads on the channels (ch4 and ch5) with the greatest and second greatest integrated values is 1,800 W (=1,000 W+800 W). When the rated power value of the load on the channel with the third greatest integrated value is added to the above-described total value, the resultant total value is 2,400 W. On the other hand, since the total power upper-limit value is set to 1,800 W, during the first output cycle 1, the channels (ch4 and ch5) with the greatest and second greatest integrated values are selected as output ON channels to prevent the "total value of the rated power values of the loads on the channels with outputs therefrom turned on" from exceeding the "total power upper-limit value (1,800 W)".

During the next output cycle 2, the integrated value [5] of the target output value of the load on the channel ch5 is 40% (=70%−100%+70%). This is because the channel ch5 has been selected as an output ON channel and provided an AC power supply (output) during the last output cycle 1, thus causing a subtraction of 100% and an addition of 70% to be carried out on the integrated value [5] during the output cycle 1, that is, 70%. The channel ch4 has also been selected as an output ON channel and provided an AC power supply (output) during the output cycle 1, and thus as a result of a calculation similar to that for the channel ch5, the integrated value [4] of the target output value of the channel ch5 is 20% (=60%−100%+60%).

Furthermore, during the output cycle 2, the integrated value [3] of the target output value of the channel ch3 is 100% (=50%+50%). This is because the channel ch3 has not been selected as an output ON channel during the last output cycle 1 and because an addition of 50% has been carried out but not a subtraction of 100%, on the integrated value [3] during the output cycle 1, that is, 50%. This also applies to the other channels ch2 and ch1 that have not been selected as output ON channels during the output cycle 1.

During the output cycle 2, all of the integrated values [1] to [5] of the target output values of the channels ch1 to ch5 are greater than the threshold value (0%), and thus all of the channels ch1 to ch5 are candidates to be selected as output ON channels.

However, the total value of the rated power of the channels (ch3, ch2, and ch1) with the greatest, second greatest, and third greatest integrated values is 1,200 W (=600 W+400 W+200 W). When the rated power value of the load on the channel (ch5) with the fourth greatest integrated value is added to the above-described total value, the resultant total value is 2,200 W. On the other hand, since the total power upper-limit value is set to 1,800 W as described above, during the second output cycle 2, the channels (ch3, ch4, and ch5) with the greatest, second greatest, and third greatest integrated values are selected as output ON channels to prevent the "total value of the rated power values of the loads on the channels with outputs therefrom turned on" from exceeding the "total power upper-limit value (1,800 W)".

During the remaining output cycles 3 to 10, a scheme similar to that for the output cycles 1 and 2 described above is used to select channels with outputs therefrom turned on. Thus, the detailed description of the output cycles 3 to 10 is omitted. This also applies to examples shown in FIG. 7, FIG. 9, and FIG. 11 described below.

As in the case of the example shown in FIG. 5, with the total power upper-limit value set to 1,800 W, all of the channels ch1 to ch5 have an achievement ratio of 1 (100%) as is the case with the above-described channel ch1 example and provide an AC power supply (output) as specified by the target output value throughout the 10 cycles (alarm determination process cycle). Thus, as a result of the alarm determination process for the 10 cycles, the determination result is "OK" for all the channels ch1 to ch5 as shown in FIG. 5. If the determination thus results in "OK" for all the channels, the alarm OFF signal is output. If the determination result is "NG" for any one of the channels as in an example shown in FIG. 7 described below, the alarm ON signal is output.

FIG. 6 is a graph showing the total value of power supplied by the channels as a whole during each output cycle, as a summary of the results of output control shown in FIG. 5.

As seen in the graph in FIG. 6, if the "total power upper-limit value" is appropriate for the "total value of the rated power values of the load on the channels", for example, the total power upper-limit value is set to 1,800 W when the total value of the rated power values of the loads on the five channels ch1 to ch5 is 3,000 W as in the case of the example shown in FIG. 5, a variation in supplied power among the channels is reduced throughout the alarm determination cycle (10 cycles). Thus, a uniform AC power supply (output) can be provided throughout the alarm determination cycle, with the power consumption peak of the whole multiple-channel temperature control device 1 limited to at most the total value of the rated power values.

FIG. 7 shows the results of output control obtained when the processing operations shown in the flowcharts in FIG. 2 and FIG. 3 are performed with the total power upper-limit value in FIG. 5 changed to 1,500 W.

Also in the example shown in FIG. 7, the total value of the rated power values of the loads on the channels ch1 to ch5 is 3,000 W. However, since the total power upper-limit value is set to 1,500 W as described above, the power consumption peak of the whole multiple-channel temperature control device 1 is limited to at most 1,500 W. That is, the example shown in FIG. 7 is also an example in which the "total power upper-limit value" is set to 1,500 W, which is lower than the "total value of the rated power values of the loads on the channels", to turn on the power consumption peak suppression function of the multichannel power controller.

The results of output control in FIG. 7 show that the determination result is "NG" for the channels ch3 to ch5. This is because the channels ch3 to ch5 have an achievement ratio of less than a predetermined value (threshold value). This will be described in detail in conjunction with the channel ch5 example. The target output value of the channel ch5 is 0.7 (70%), the target output value sum thereof is 0.7×10=7, and the number of output ON operations thereof during the 10 cycles (alarm determination cycle) is 6. Furthermore, the output average value [5] of the channel ch5 is determined to be 0.6 by "the number of output ON operations [ch] of the processing target channel÷the alarm determination cycle", that is, 6÷10. The target output average value [5] of the channel ch5 is determined to be 0.7 by "the target output value sum [ch]÷the alarm determination cycle", that is, 7÷10. Thus, the achievement ratio [5] of the channel ch5 is determined to be lower than 1 (100%) by "the output average value÷the target output average value", that is, 0.6÷0.7. Hence, the channel ch5 does not provide an AC power supply (output) as specified by the target output value throughout the 10 cycles. This also applies to the other channels ch3 and ch4.

FIG. 8 is a graph showing the total value of power supplied by the channels as a whole during each output cycle, as a summary of the results of output control shown in FIG. 7.

As seen in the graph in FIG. 8, if the "total power upper-limit value" is excessively small compared to the "total value of the rated power values of the load on the channels" (the total power upper-limit value is inappropriate), for example, the total power upper-limit value is set to 1,500 W when the total value of the rated power values of the loads on the five channels ch1 to ch5 is 3,000 W as in the case of the example shown in FIG. 7, the power consumption peak can be suppressed but some channels fail to provide an AC power supply (output) as specified by the target output value.

FIG. 9 shows the results of output control obtained when the processing operations shown in the flowcharts in FIG. 2 and FIG. 3 are performed with the total power upper-limit value in FIG. 5 changed to 3,000 W.

Also in the example shown in FIG. 9, the total value of the rated power values of the loads on the channels ch1 to ch5 is 3,000 W. However, since the total power upper-limit value is set the same value as the total value of the rated power values (3,000 W) as described above, the power consumption peak of the whole multiple-channel temperature control device 1 is prevented from being limited to at most the total value of the rated power values of the loads on the channels.

That is, if the total power upper-limit value is set equal to the "total value of the rated power values of the loads on the channels" as in the case of the example shown in FIG. 9 or greater than the total value, the power consumption peak suppression function of the multichannel power controller 3 as illustrated in the examples in FIG. 5 and FIG. 7 are substantially turned off. To allow the power consumption peak suppression function to be turned on, the total power upper-limit value may be set smaller than the total value of the rated power values of the loads on the channels ch1 to ch5 as in the case of the examples shown in FIG. 5 and FIG. 7.

The results of output control in FIG. 9 show that the determination result is "OK" for all of the channels ch1 to ch5. This is because the channels ch1 to ch5 have an achievement ratio of not lower than the threshold value (predetermined value).

FIG. 10 is a graph showing the total value of power supplied by the channels as a whole during each output cycle, as a summary of the results of output control shown in FIG. 9.

As seen in the graph in FIG. 10, with the total power upper-limit value set the same value as the total value of the rated power values of the loads on the channels ch1 to ch5 as in the case of the example shown in FIG. 10, when the power consumption peak suppression function of the multichannel power controller is turned off, the power supplied by the channels as a whole during the 10 cycles varies significantly, for example, the power supplied by the channels ch1 to ch5 as a whole has the maximum value of 3,000 W during the first output cycle 1 and the minimum value of 1,000 W during the fourth output cycle 4. This precludes a uniform AC power supply (output) from being provided throughout the 10 cycles.

FIG. 11 is a diagram of a configuration of a power control system in a factory with a plurality of the multichannel power controllers shown in FIG. 1. In FIG. 11 and the description below, a plurality of heaters H1 to H5 to be subjected to power control by the single multichannel power controller 3 as shown in FIG. 11 are collectively referred to as a "load apparatus". Such a load apparatus is not limited to a heater-like load apparatus but may be a power-based load apparatus such as a screw or a winder.

In FIG. 11, in addition to the first to seventh functions all described above, the multichannel power controller 3 for each load apparatus further has a function to communicate with an external host computer, specifically, a function to transmit the "total power upper-limit value" and the "alarm ON/OFF signal" described above to the host computer HC and a function to receive predetermined instructions to turn on or off the power consumption peak suppression function from the host computer HC, and a function to turn on or off the power consumption peak suppression function based on the received instruction signal.

The above-described "total power upper-limit value" is set in the multichannel power controller 3 in accordance with a predetermined instruction from the host computer HC. However, the "total power upper-limit value" may be manually set such that every time the set value is changed, the changed "total power upper-limit value" is transmitted to the host computer HC. The above-described "alarm ON/OFF signal" may be transmitted to the host computer HC every time the signal is output.

Among the predetermined instructions received from the host computer HC, an instruction to turn off the power consumption peak suppression function includes the "total value of the rated power values of the loads on the channels". Upon receiving this instruction, the multichannel power controller 3 sets the "total value of the rated power values of the loads on the channels" in the instruction to be the "total power upper-limit value". This turns off the power consumption peak suppression function of the multichannel power controller 3 as described in the example shown in FIG. 10.

Furthermore, among the predetermined instructions received from the host computer HC, an instruction to turn on the power consumption peak suppression function includes a power value smaller than the "total value of the rated power values of the loads on the channels". Upon receiving this instruction, the multichannel power controller 3 sets the "smaller power value" in the instruction to be the "total power upper-limit value". This turns on the power consumption peak suppression function of the multichannel power controller 3 as described in the example shown in FIG. 5.

FIG. 12 is a diagram showing the concept of elapsed time and power consumption observed when (three) multichannel power controllers shown in FIG. 11 control the power to the respective load apparatuses.

The host computer HC in FIG. 11 gives an activation instruction, at different points of time, to heater-like load apparatuses N1 to N3 in FIG. 12 to be controlled by the respective three multichannel power controllers, thus activating the load apparatuses N1 to N3 so that a time to elevate the temperature varies among the load apparatuses N1 to N3.

Furthermore, the host computer HC outputs the predetermined instructions to each of the multichannel power controllers 3 for the load apparatuses N1 to N3 to set the power consumption peak suppression function of the multichannel power controller 3 so that the power consumption peak suppression function is on during a normal operation following the temperature elevation and off during the temperature elevation. Thus, varying power to each heater-like load apparatus during the normal operation is ensured to be limited to at most the "total power upper-limit value", thus enabling a reduction in the total value of varying power.

Conventional power controllers are not configured to limit the output (AC power supply) from the channels as a whole using the "total power upper-limit value" similarly to the multichannel power controller 3 according to the present invention. Thus, in FIG. 12, the value of supplied power varies randomly around a curve and a straight line which are indicative of the supplied power and which correspond to a period of temperature elevation and a period of operation, respectively. Simultaneously turning on the outputs from the channels may provide the maximum power consumption peak that corresponds to the total value of the rated power values of the loads on the channels. However, the multichannel power controller 3 according to the present invention sets the "total power upper-limit value" smaller than the "total value of the rated power values of the loads on the channels" to turn on (enable) the power consumption peak suppression function. This ensures that the power consumption of the channels as a whole is limited to at most the "total power upper-limit value".

Moreover, the above-described host computer HC may set an upper limit value for power that can be used by the plurality of load apparatuses N1 to N3 as a whole (hereinafter referred to as a "power upper-limit value of a load apparatus group") to controllably prevent the power consumption of the load apparatus group from exceeding the power upper-limit value of the load apparatus group, based on the power upper-limit value of the load apparatus group and the total power upper-limit value received from the multichannel power controller 3 for each load apparatus.

FIG. 13 and FIG. 14 show an example of the relationship between the "total power upper-limit value" and the "power upper-limit value of the load apparatus group" which are set in the multichannel power controller for each load apparatus when the (three) multichannel power controllers in FIG. 11 control the power to the respective load apparatuses.

As shown in FIG. 13, an assumption is made as follows. If the load apparatuses N1 to N3 group have a power upper-limit value of 6,000 W and the total power upper-limit value in the multichannel power controller for the load apparatus N3 is set to 1,000 W in accordance with an instruction from the host computer HC in FIG. 11, when the two load apparatuses N1 and N2 are to be simultaneously brought into a temperature elevation state, the "total power upper-limit value" in the multichannel power controller for each of the load apparatuses N1 and N2 is set equal to the "total value of the rated power values of the loads on the channels (3,000 W)" to simultaneously turn off the power consumption peak suppression functions of the two multichannel power controllers. Then, the total power consumption of the load apparatuses N1 to N3 is 7,000 W, which is greater than the power upper-limit value of the load apparatus group. This precludes the two load apparatuses from being simultaneously increased in temperature by simultaneously turning off the power consumption peak suppression functions of the two multichannel power controllers. The elevation of temperature of the load apparatus N2 fails to be started until the elevation of temperature of the load apparatus N1 is completed, thus preventing efficient operation.

Hence, as shown in FIG. 14, for the multichannel power controller for the load apparatus N1, the host computer HC in FIG. 11 sets the "total power upper-limit value" equal to the "total value of the rated power values of the loads on the channels (3,000 W)" to set the power consumption peak suppression function off. On the other hand, for the multichannel power controller for the load apparatus N2, the total power upper-limit value is set to 2,000 W so as to prevent the total power consumption of the load apparatus as a whole from exceeding the power upper-limit value of the load apparatus group. Then, even while the temperature of the load apparatus N1 is being elevated, the load apparatus N2 can be increased in temperature to the extent that the power upper-limit value of the load apparatuses N1 to N3 group is not exceeded. This enables the apparatuses to be efficiently operated.

When the total power upper-limit value is set smaller than routinely required power consumption such as the power consumption during normal operation, some channels fail to provide an AC power supply (output) as specified by the target output value as in the case of the example shown in FIG. 7 described above. With this state left uncontrolled, if control targets are heaters, these channels supply insufficient power to the corresponding heaters, thus preventing temperature control performed by the heaters from functioning normally. In this case, in any output cycle during the alarm determination cycle, any of the channels has an achievement ratio of less than the predetermined ratio (threshold value) and the multichannel power controller outputs the alarm ON signal, as described above. Thus, the host computer HC that has received the alarm ON signal, when the alarm ON signal continues at least for a predetermined duration (for example, for 100 alarm determination cycles) or when the alarm ON signal is received, urges an apparatus manager to take a measure for allowing the temperature control to be normally performed, for example, issues an alarm based on the alarm ON signal. Such an alarm may be issued based on the alarm ON signal output by each multichannel power controller itself.

The embodiment has been described in conjunction with the multichannel power controller with five channels. However, the number of channels is not limited to five but may be increased or reduced as necessary. Furthermore, the number of load apparatuses may also be appropriately increased or reduced as necessary.

Furthermore, in the example described above in the embodiment, the multichannel power controller according to the present invention is adopted for the multiple-channel temperature control device 1 to control the AC power supplies to the heaters H1 to H5. However, the present invention is not limited to this example. The multichannel power controller according to the present invention is applicable to the control of AC power supplies to loads other than heaters.

The multichannel adjuster 2 and multichannel power controller 3 described in the embodiment may be configured into a single device so that the functions of the adjuster 2 and controller 3 are integrated together.

REFERENCE SIGNS LIST

1 Multiple-channel temperature control device
2 Multichannel adjuster
3 Multichannel power controller
P AC power source
ch1, ch2, ch3, ch4, ch5 Channels
H1, H2, H3, H4, H5 Heaters
HC Host computer
MV1 Target output value of channel ch1
MV2 Target output value of channel ch2
MV3 Target output value of channel ch3
MV4 Target output value of channel ch4
MV5 Target output value of channel ch5
N1 to N3 Load apparatuses
PV1 Measured temperature of control target to be heated by heater H1
PV2 Measured temperature of control target to be heated by heater H2
PV3 Measured temperature of control target to be heated by heater H3
PV4 Measured temperature of control target to be heated by heater H4
PV5 Measured temperature of control target to be heated by heater H5
SV1 Set temperature of control target to be heated by heater H1
SV2 Set temperature of control target to be heated by heater H2
SV3 Set temperature of control target to be heated by heater H3
SV4 Set temperature of control target to be heated by heater H4
SV5 Set temperature of control target to be heated by heater H5
T1, T2, T3 Variable tables

The invention claimed is:

1. A multichannel power controller outputting an ON signal or avoiding outputting the ON signal, at a point near a zero potential of an AC power voltage, to each of a plurality of channels that provides an AC power supply as an output to a load, during a unit time that is a minimum time for which the output is on or off, thus distributing the output among the unit times comprising:
   means for presetting a rated power value of the load on each of the channels and a total power upper-limit value that is an upper limit value of a total output power from all the channels during each of the unit times,
   means for sequentially integrating a target output value of each channel, at each of the unit times, in a target output value integrator for the channel which integrates the target output value of the each channel, and
   means for, after the integration process is finished for all the channels, carrying out the following processing on a channel by channel basis in order of decreasing integrated value of the target output value integrator for the channel,
   wherein, when the integrated value of the target output value integrator is not greater than a threshold value, the multichannel power controller keeps the output from the channel off during the unit time,
   wherein, when the integrated value of the target output value integrator is greater than the threshold value and a value obtained by adding the rated power value of the load on the channel to a rated power total value of a rated power totalizer totaling the rated power values of the loads on the channels with outputs therefrom turned on by the ON signal is equal to or smaller than the total power upper-limit value, the multichannel power controller carries out a process of adding the rated power value of the channel to the rated power totalizer, a process of keeping the output from the channel on during the unit time, and a process of subtracting 1 or 100% from the target output value integrator for the channel, and
   wherein, when the integrated value of the target output value integrator is greater than the threshold value and the value obtained by adding the rated power total value of the rated power totalizer to the rated power value of the channel is equal to or greater than the total power upper-limit value, the multichannel power controller keeps the output from the channel off during the unit time.

2. The multichannel power controller according to claim 1, wherein the channels are processed in order of decreasing integrated value of the target output value integrator for the channel, if the integrated value is identical for at least two channels, the channel with higher rated power is preferentially processed, and if the rated power is also identical for the channels, any of the channels with the identical integrated value and the identical rated power is preferentially selected.

3. The multichannel power controller according to claim 1, wherein further calculating a target output average value for each channel over a predetermined period and an average value of an actual output value of the channel over the predetermined period and outputting an alarm ON signal if a ratio of the calculated average value of the actual output value to the calculated target output average value is lower than a predetermined threshold value or a value obtained by subtracting the average value of the actual output value from the target output average value is equal to or greater than the predetermined threshold value.

4. The multichannel power controller according to claim 1, wherein disabling a power consumption peak suppression function by setting the total power upper-limit value equal to or greater than a total value of the rated power values of the loads on the respective channels.

5. The multichannel power controller according to claim 1, wherein further comprising a function to communicate with an external host computer, and when the external host computer outputs an instruction including the total power upper-limit value to the multichannel power controller, managing enabling/disabling of a function to set the total power upper-limit value equal to or smaller than the upper limit value of the total output power from all the channels during each of the unit times.

\* \* \* \* \*